(12) United States Patent
Weller et al.

(10) Patent No.: US 12,514,895 B2
(45) Date of Patent: Jan. 6, 2026

(54) TOPICAL HERBAL HEALING FORMULATION

(71) Applicant: Copper Hawk Limited, Shannon (IE)

(72) Inventors: Kerri-Anne Carlene Weller, Westport (IE); Kit Freedom Weller, Westport (IE); Neil James McLoughlin, Westport (IE)

(73) Assignee: Copper Hawk Limited, Shannon (IE)

( * ) Notice: Subject to any disclaimer, the term of this patent is extended or adjusted under 35 U.S.C. 154(b) by 82 days.

(21) Appl. No.: 15/767,047

(22) PCT Filed: Oct. 10, 2016

(86) PCT No.: PCT/EP2016/074244
§ 371 (c)(1),
(2) Date: Apr. 9, 2018

(87) PCT Pub. No.: WO2017/060535
PCT Pub. Date: Apr. 13, 2017

(65) Prior Publication Data
US 2020/0330543 A1    Oct. 22, 2020

(30) Foreign Application Priority Data
Oct. 9, 2015    (GB) ...................................... 1517878

(51) Int. Cl.
| | |
|---|---|
| *A61P 17/02* | (2006.01) |
| *A61K 9/00* | (2006.01) |
| *A61K 9/06* | (2006.01) |
| *A61K 36/28* | (2006.01) |
| *A61K 36/47* | (2006.01) |
| *A61K 36/68* | (2006.01) |
| *A61K 36/808* | (2006.01) |
| *A61K 36/886* | (2006.01) |
| *A61K 47/06* | (2006.01) |
| *A61K 47/44* | (2017.01) |

(52) U.S. Cl.
CPC .......... *A61K 36/808* (2013.01); *A61K 9/0014* (2013.01); *A61K 9/06* (2013.01); *A61K 36/28* (2013.01); *A61K 36/47* (2013.01); *A61K 36/68* (2013.01); *A61K 36/886* (2013.01); *A61K 47/06* (2013.01); *A61K 47/44* (2013.01); *A61P 17/02* (2018.01)

(58) Field of Classification Search
None
See application file for complete search history.

(56) References Cited

U.S. PATENT DOCUMENTS

| | | | |
|---|---|---|---|
| 3,809,749 A | 5/1974 | Persinos | |
| 2004/0161524 A1* | 8/2004 | Sakai | ..................... A23K 10/30 |
| | | | 426/655 |
| 2004/0224012 A1* | 11/2004 | Suvanprakorn | ........ A61Q 19/00 |
| | | | 424/450 |
| 2005/0074510 A1* | 4/2005 | Bobrowski | ............ A61K 45/06 |
| | | | 424/779 |
| 2006/0004189 A1* | 1/2006 | Gandy | ................. C07K 14/475 |
| | | | 530/399 |

FOREIGN PATENT DOCUMENTS

| | | | |
|---|---|---|---|
| CN | 103142966 A | * | 6/2013 |
| GB | 2485483 A | | 5/2012 |
| WO | 0072860 A1 | | 7/2000 |
| WO | 2007030666 A2 | | 3/2007 |
| WO | 2009071213 A1 | | 6/2009 |

OTHER PUBLICATIONS

2014 Nature's best https://web.archive.org/web/20140507040850/ https://www.naturesbesthealthstore.com/products/pau-d-arco-lotion-4-oz-tube.*
International Search Report, PCT/EP2016/074244, dated Apr. 10, 2018.
Somboonwong et al., "Wound healing activities of different extracts of Centella asiatica in incision and burn wound models: an experimental animal study", BMC Complementary & Alternative Medicine 2012, 12:103.
Zubair et al., "Effects of *Plantago major* L. leaf extracts on oral epithelial cells in a scratch assay", Journal of Ethnopharmacology, vol. 141, Issue 3, Jun. 14, 2012, pp. 825-830.
Nowak et al., "Application and characteristics of Achillea millefolium and its oil", CHEMIK 2010, 64, 2, pp. 103-110.
Saeidnia et al., "A review on phytochemistry and medicinal properties of the genus *Achillea*", DARU vol. 19, No. 3, 2011, pp. 173-186.
Stevenson et al., "Wound Healing Activity of Acylated Iridoid Glycosides from Scrophularia nodosa", Phytotherapy Research, vol. 16, 2002, pp. 33-35.
Vasconcelos et al., "Antimicrobial, antioxidant and cytotoxic activity of extracts of Tabebuia impetiginosa (Mart. ex DC.) Standl.", Journal of Chemical and Pharmaceutical Research, 2014, 6(7): 2673-2681.
Thakur et al., "Pratices in Wound Healing Studies of Plants", Evidence-Based Complementary and Alternative Medicine, vol. 2011, Article ID 438056, 17 pages.

(Continued)

*Primary Examiner* — Terry A Mckelvey
*Assistant Examiner* — Catheryne Chen
(74) *Attorney, Agent, or Firm* — Master Key IP, LLP; Jeromye V. Sartain

(57) ABSTRACT

This invention relates to a topical herbal formulation that is particularly suitable for the treatment of wounds and a process for the manufacture thereof. More specifically, this invention relates to a topical wound-healing herbal formulation comprising gotu kola (*Centella asiatica*), greater plantain (*Plantago major*), figwort (*Scrophularia nodosa*), yarrow (*Achillea millefolium*) and Pau d'Arco (*Tabebuia impetiginosa*). The herbal formulation has both anti-inflammatory and anti-microbial properties. The formulation is particularly effective in the treatment of horse wounds, preventing the formation or raised hairless scars and promoting hair regrowth in the horse without the need for the introduction of an extracellular matrix. The formulation is also suitable for the treatment of general skin disorders in humans including, but not limited to, eczema and nappy rash.

24 Claims, 26 Drawing Sheets

(56) References Cited

OTHER PUBLICATIONS

Ali et al., "Essential oils used in aromatherapy: A systemic review", ScienceDirect, accessed Jul. 20, 2020 from https://www.sciencedirect.com/science/article/pii/S2221169115001033?via%3Dihub.
"Echinacea has long been used to treat the immune system" article accessed Aug. 15, 2016 from http://alternative-healthzine.com/echinacea-wonder-herb/.
"Pau D'Arco Lotion" article on GoinHerbs.com accessed Aug. 15, 2016 from http://goinherbs.com/?sn=1614-4.

* cited by examiner

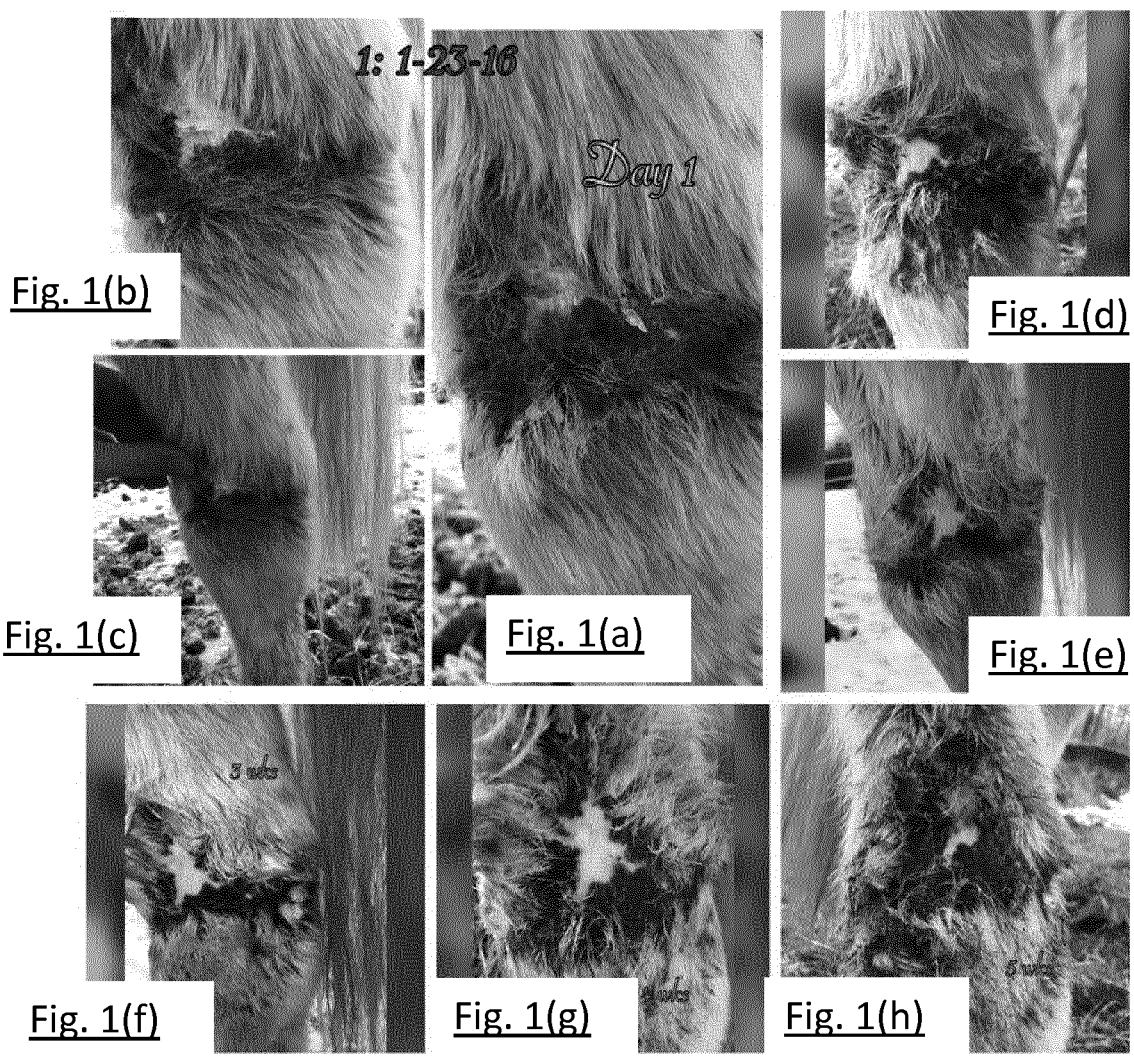

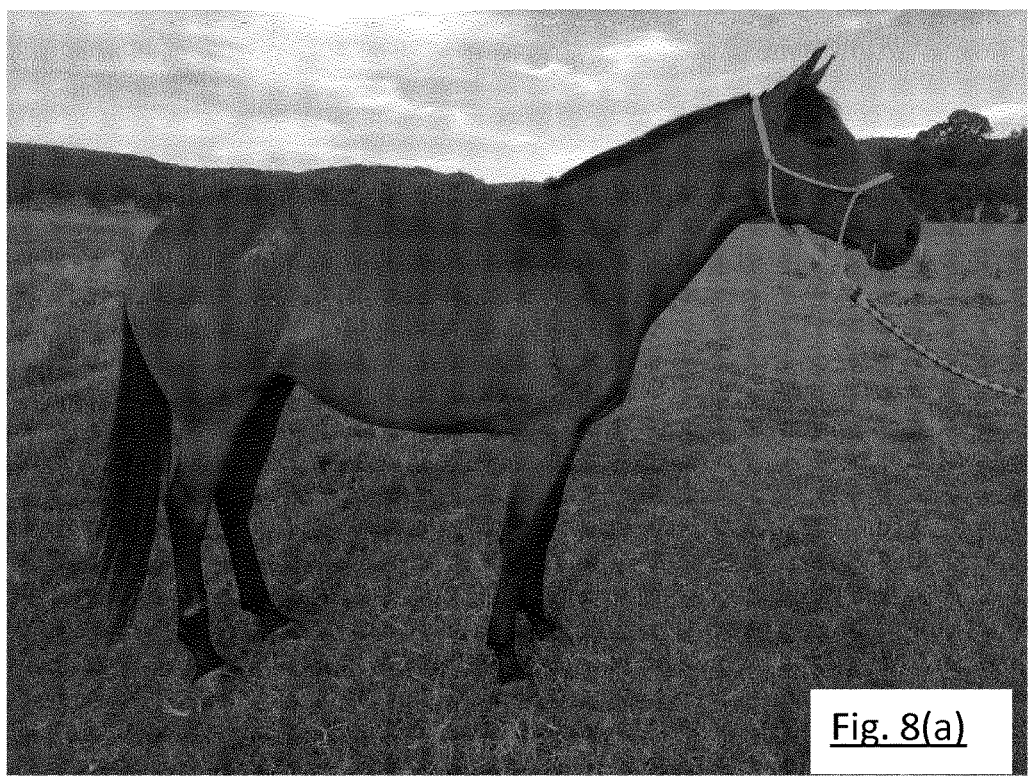
Fig. 8(a)
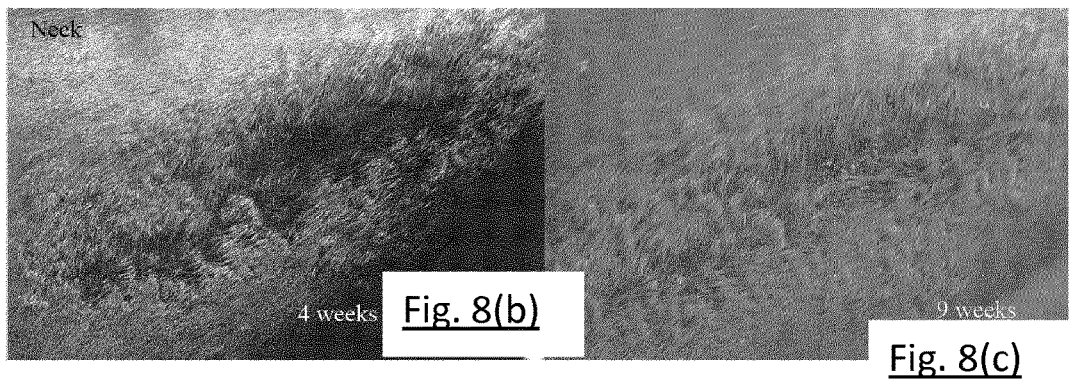
4 weeks Fig. 8(b)  9 weeks Fig. 8(c)
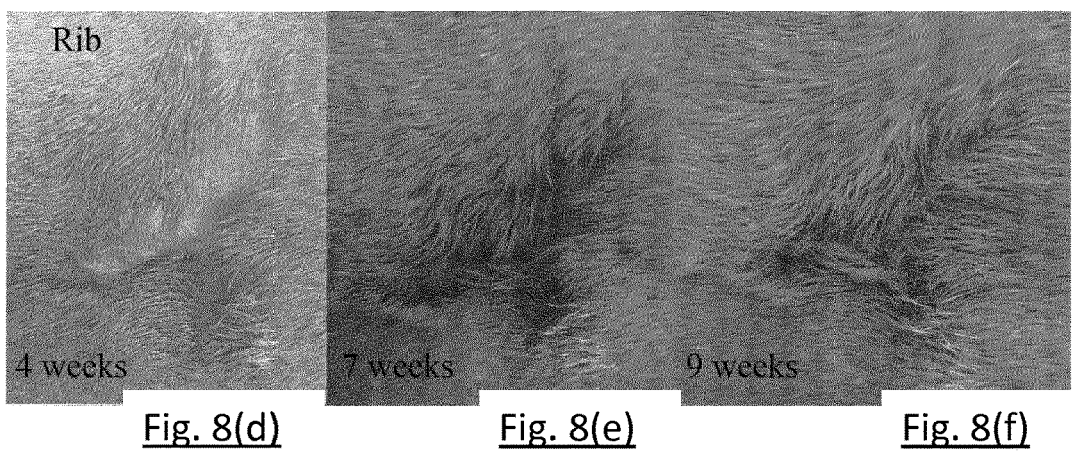
4 weeks Fig. 8(d)   7 weeks Fig. 8(e)   9 weeks Fig. 8(f)

TOPICAL HERBAL HEALING FORMULATION

RELATED APPLICATIONS

This application is a U.S. national stage entry under 35 U.S.C. § 371 from International PCT application Ser. No. PCT/EP2016/074244 filed on Oct. 10, 2016 and entitled "A topical herbal healing formulation," which itself claims priority and is entitled to the filing date of British application Ser. No. GB 1517878.3 filed Oct. 9, 2015, and entitled "A topical herbal healing formulation." The contents of the aforementioned applications are incorporated herein by reference.

TECHNICAL FIELD

This invention relates to a topical herbal formulation for wounds and a process for the manufacture thereof. More specifically, this invention relates to a topical wound-healing herbal formulation having anti-inflammatory and anti-microbial properties. The formulation is particularly effective in the management of horse wounds but also has applications for humans and other animals. The formulation also has application as a cosmetic product.

BACKGROUND ART

It is well known that horses' wounds take a very long time to heal. A bad cut can be career-ending for a horse and even life-threatening if it becomes infected, which happens all too often due to the slow healing process. Horses are prone to excessive inflammation in the early stages of healing which is painful for the horse and is also an impediment to the healing process. In addition to this, horses tend to produce excessive granulation tissue during healing and the end result is often a raised, hairless scar. This is particularly undesirable as a beautiful, even and shiny coat is highly prized in horses.

There are several preparations available to treat wounds in humans and animals. However, many synthetic antimicrobial agents are also irritants, so while they may prevent infection of a wound, they also inhibit healing. Compositions containing these chemicals are usually unsuitable for those individuals prone to allergies and many people for a variety of reasons avoid certain chemicals found in disinfecting lotions. In addition to this, organic farming requires the use of non-synthetic treatments where possible.

PCT Patent Application Publication No. WO2009/071213, in the name of Bayer Consumer Care AG, discloses how *Centella asiatica* is known and used for healing, sedative, analgesic, antidepressant, antiviral and antimicrobial properties. Extracts containing such compounds have been used in the pharmaceutical and cosmetic industries for treating wounds, scars and venous insufficiency as well as for dermis restoration and anti-inflammatory properties.

PCT Patent Application Publication No. WO00/72860, in the name of Larsen, discloses a wound healing article comprising dried and crushed leaves from *Plantago major*.

The article entitled "Wound Healing Activity of Acylated Iridoid Glycosides from *Scrophularia nodosa*", in the name of Stevenson et al, published in Phytotherapy Research Volume 16, Pages 33-35 (2002) describes how Figwort has been known to be used in the treatment of wounds.

PCT Patent Application Publication No. WO2007/03066, in the name of Herbal Intervention Corporation, discloses a herbal skin care composition for the promotion of wound healing comprising, inter alia, yarrow and plantain extracts.

The article entitled "A review of phytochemistry and medicinal properties of the genus *Achillea*", in the name of Saeidnia et al, published in the journal DARU, Volume 19, No. 3 (2011) describes how yarrow is known to treat wounds. The webpage http://www.goinherbs.com/?sn=1614-4 discloses a lotion made with Pau d'Arco for use with a variety of skin diseases and infections for its anti-bacterial, antifungal and anti-inflammatory benefits. The webpage http://www.alternative-healthzine.com/echinacea-wonder-herb/ describes how *Echinacea* is known for use in the treatment of wounds.

U.S. Pat. No. 3,809,749, in the name of Amazon Natural Drug Company discloses how the sap from the tree *Croton lechleni* may be used in the manufacture of a pharmaceutical composition for topical use in the treatment of skin wounds. With the exception perhaps of WO2007/03066, little has been done to consider the potential benefits of combining two or more of these known components in the treatment of wounds.

This invention aims to overcome at least one of the above-mentioned problems and provide a useful choice to the consumer.

SUMMARY OF INVENTION

According to the invention there is provided a topical healing formulation comprising:
(i) Gotu Kola (*Centella asiatica*);
(ii) Common Plantain (*Plantago major*);
(iii) Figwort (*Scrophularia nodosa*);
(iv) Yarrow (*Achillea millefolium*); and
(v) Pau d'Arco (*Tabebuia impetiginosa*).

This has been found to be a particularly beneficial combination of ingredients for healing and it has been found that when these components are combined that they provide a synergistic healing effect, not limited to animal topical application, but also with humans. Firstly, when applied to a wound before healing begins the formulation prevents infections. Gotu kola has antibacterial components and there is evidence that it also increases collagen production which aids wound healing. It is vitally important to prevent infection of a wound with antibacterial and antifungal treatments in addition to cleaning and dressing the wound. This is particularly the case with animal wounds which may be difficult to wash and keep clean. In the case of skin disorders, damaged, cracked skin can become infected very easily compared to healthy skin and it is essential to prevent this. The formulation also helps to control inflammation. Much of the damage caused to a horse's coat during healing is due to excessive inflammation and for this reason controlling inflammation is a priority in wound management. In skin disorders, inflammation causes itching and pain and also manifests as redness, which is undesirable for cosmetic reasons. Greater Plantain, Figwort and Pau d'Arco are effective as anti-inflammatory ingredients. Yarrow has a variety of useful healing properties including anti-inflammatory activity and an ability to slow bleeding and has been found to improve the efficacy of the formulation. Yarrow magnifies the other herbs active constituents. The formulation according to the invention is designed to clean the wound before healing begins.

In one embodiment of the invention there is provided a topical healing formulation further comprising a carrier base. The carrier base extracts the active compounds from the plants and ensures that the active compounds are in contact with the wound where they are needed. The carrier base can also form a seal around the wound and help the wound to retain moisture while preventing ingress of bacteria.

In one embodiment of the invention there is provided a topical healing formulation in which the carrier base comprises petrolatum. Petrolatum is very effective at extracting the active components of the plants and will form a protective barrier on the wound which will help prevent infection and prevent drying out of the wound. In addition to this it is generally well-tolerated and non-allergenic, it has a low cost and it does not oxidise. Petrolatum also has a suitable viscosity for application to a wound in a thick layer if necessary and will not rub off easily which is a very useful quality if the preparation is to be used on an animal without a dressing.

In one embodiment of the invention there is provided a topical healing formulation comprising 1% to 12% Gotu Kola, between 1% to 12% Common Plantain, between 1% to 12% Figwort, between 1% to 12% Yarrow and between 1% to 12% Pau d'Arco. The ranges of 1% to 12% have been found to be adequate for most applications without causing side-effects. These percentages refer to the amount of plant used before extraction. After the active components of the plants are extracted from the plants into the carrier base, the remaining plant structures are typically removed by filtration.

In one embodiment of the invention there is provided a topical healing formulation comprising between 6% to 10% Gotu Kola, between 6% to 10% Common Plantain, between 6% to 10% Figwort, between 6% to 10% Yarrow and between 6% to 10% Pau d'Arco. These ranges are particularly suited to wound management which requires a high concentration of active compounds.

In one embodiment of the invention there is provided a topical healing formulation further comprising 1% to 12% Echinacea (*Echinacea augustifolia*). Echinacea is effective at preventing fungal infections.

In one embodiment of the invention there is provided a topical healing formulation further comprising 6% to 10% Echinacea *Echinacea augustifolia*.

In one embodiment of the invention there is provided a topical healing formulation further comprising 1 to 12% Sangre de Grado (Dragon's Blood resin). Sangre de Grado/Dragon's Blood resin contains antiseptic compounds and has a substantial thickening effect on the formulation, allowing the formation of an effective seal over the treated skin. This percentage refers to the mass of the Dragon's Blood resin present in the final formulation. It is not further processed or extracted.

In one embodiment of the invention there is provided a topical healing formulation further comprising 6 to 10% Sangre de Grado (Dragon's Blood resin). This is the most effective range for wound management.

In one embodiment of the invention there is provided a topical healing formulation wherein the carrier base comprises one or more of the following: petrolatum, soft white paraffin, emollient, Silcock's base, aqueous cream, jojoba oil, shea butter, coconut oil, Dragon's Blood resin, thickener, stabilizer, essential oil and preservative. These are all capable of extracting the active components from the plants but have different viscosities which may suit different applications. For instance, for cosmetic reasons a less viscous formulation comprising jojoba oil may be preferable for application to the skin of a person's face, but a thicker formulation may be desired for the lips to impart a shine. Furthermore, a less viscous formulation may be adequate for treating skin disorders such as eczema and nappy rash while a more viscous formulation with waxes or thickening agents will be longer lasting and may be applied in a thicker layer, which is advantageous for treating a deep wound. In regions of the world where coconut oil, jojoba oil or shea butter are already used extensively for treating the skin, these may be the preferred carrier bases as there may be a preference among users for ingredients that they are familiar with as this will reduce the risk of an adverse reaction. Essential oils impart a pleasant fragrance on the product and many have further antiseptic properties. The preservative may be provided by way of one or both of Vitamin E and Grapefruit seed extract and the stabiliser may be provided by way of the introduction of both Vitamin E and Grapefruit seed extract.

In one embodiment of the invention there is provided a topical healing formulation comprising one or more of the following oils: olive oil, jojoba oil, almond oil, avocado oil, argan oil, grape seed oil, rapeseed oil, sesame oil, coconut oil, borrage oil and safflower oil. These oils have different viscosities which may be suitable for different applications. Furthermore, a preparation may be made on site from an essential oil of the herbs which comprise the formulation or from the dried herbs which comprise the formulation with an oil of the user's choice. Locally produced oils may be preferable for environmental reasons as they reduce transport costs. Additionally, there may be a preference among users for ingredients that they are familiar with as this will reduce the risk of an adverse reaction.

In one embodiment of the invention there is provided a topical healing formulation comprising one or more of the following thickeners: wheatflour, cornflour, baking powder, arrowroot and slippery elm. A thick formulation may be preferable if a thick layer is to be applied to a wound. In use with a horse or other animal it is also advantageous to use ingredients that occur naturally in the animal's surroundings to reduce the risk of an adverse reaction.

In one embodiment of the invention there is provided a topical healing formulation comprising essential oils from one or more of the following: St. John's Wort (*Hypericum perforatum*), Goldenseal (*Hydrastis canadensis*), Lemon balm (*Melissa officianalis*), chickweed, nettle, Lavender (*Lavendula augustifolio*), elderflower and Sangre de Grado (Dragon's Blood resin). St. John's Wort is not used in preparations for horses but is advantageous for preparations for human skin.

In one embodiment of the invention there is provided a topical healing formulation further comprising an extract of one or more of the following antifungal agents: clove, tea tree oil and cinnamon bark.

In one embodiment of the invention there is provided a topical healing formulation further comprising *Aloe vera* (*Aloe barbadensis*). Aloe vera is a popular treatment for burns.

In one embodiment of the invention there is provided a topical healing formulation in which the formulation is an ointment. This is a particularly preferred embodiment for treating animal wounds or deep wounds because it is difficult to rub off the skin.

In one embodiment of the invention there is provided a topical healing formulation in which the formulation is a cream. This is a particularly preferred embodiment for treating a person's hands and face where the thicker ointment may be unsightly or inconvenient. In one embodiment of the invention there is provided a topical healing formulation in which the formulation is a body butter. This is a preferred embodiment for treating a person's body.

In one embodiment of the invention there is provided a topical healing formulation in which the formulation is an essential oil. It is envisaged that this can then be mixed by the user with a base like Silcock's base or petrolatum.

In one embodiment of the invention there is provided a topical healing formulation in which the formulation is a powder. It is envisaged that this powder can then be mixed by the user with a base like Silcock's base or petrolatum.

In one embodiment of the invention there is provided a topical wound-healing formulation in which the formulation is an oil.

In one embodiment of the invention there is provided a use of the topical healing formulation as a medicament.

In one embodiment of the invention there is provided a use of the topical healing formulation for treating at least one of nappy rash, dry skin, eczema, dermatitis, wounds, infected wounds, suppurating wounds, discharging wounds, burns and skin disorders in humans.

In one embodiment of the invention there is provided a use of the topical healing formulation for treating at least one of hairless scars, de-gloved soft tissue injuries, dermatitis, abrasions, wounds, infected wounds, suppurating wounds, discharging wounds, burns and skin disorders in animals. Specifically, there is provided a use of the topical healing formulation for treating horses.

In one embodiment of the invention there is provided a use of the topical healing formulation in the manufacture of a cosmetic product.

In one embodiment of the invention there is provided a process for producing a topical healing ointment comprising the steps of:
melting a carrier base;
adding dried leaves of Gotu Kola, Common Plantain, Figwort, Yarrow and Pau d'Arco to the melted carrier base;
maintaining the mixture at a temperature of between 45° C. to 58° C. for between 3 to 96 hours;
filtering the mixture to remove the leaves;
placing the filtered mixture in a container which is then sealed;
allowing the filtered mixture to cool to an ointment.

In one embodiment of the invention there is provided a process for producing a topical healing crème comprising the steps of:
providing a Silcock's base;
gradually adding a herbal tincture of each of Gotu Kola, Common Plantain, Figwort, Yarrow and Pau d'Arco to the base;
thoroughly mixing the herbal tinctures with the base; and
placing the mixture in a container which is then sealed.

In one embodiment of the invention there is provided a process for producing a topical healing essential oil comprising the steps of:
adding roughly chopped leaves of each of Gotu Kola, Common Plantain, Figwort, Yarrow and Pau d'Arco to water;
leaving the mixture to stand for between 3 hours and 3 weeks;
filtering the mixture to remove the leaves; and
placing the filtered mixture in a container which is then sealed.

In one embodiment of the invention there is provided a process for producing a topical healing essential oil comprising the steps of:
applying a steam distillation process to a mixture of leaves of each of Gotu Kola, Common Plantain, Figwort, Yarrow and Pau d'Arco;
placing the distillate in a container which is then sealed.

In one embodiment of the invention there is provided a process for producing a topical healing essential oil comprising the steps of:
applying a wax extraction process to a mixture of leaves of each of Gotu Kola, Common Plantain, Figwort, Yarrow and Pau d'Arco;
placing the extract in a container which is then sealed.

In one embodiment of the invention there is provided a process for producing a topical healing powder comprising the steps of:
adding each of Gotu Kola, Common Plantain, Figwort, Yarrow and Pau d'Arco in powder form to a powder base;
mixing the Gotu Kola, Common Plantain, Figwort, Yarrow and Pau d'Arco in powder form with the powder base; and
placing the mixture in a container which is then sealed.

In one embodiment of the invention there is provided a process for producing a topical healing oil comprising the steps of:
placing roughly chopped dried leaves of each of Gotu Kola, Common Plantain, Figwort, Yarrow and Pau d'Arco in a container;
covering the leaves with oil;
maintaining the leaves covered in oil at a temperature of between 12° C. to 24° C. for at least 3 weeks;
filtering the leaves from the oil; and
packaging the filtered oil.

In one embodiment of the invention there is provided a process for producing a topical healing oil in which the oil comprises jojoba oil.

In one embodiment of the invention there is provided a process for producing a topical healing body butter comprising the steps of:
melting beeswax and shea butter over a low heat;
adding at least one of an oil and an essential oil to the melted beeswax and shea butter mixture, the oil containing each of Gotu Kola, Common Plantain, Figwort, Yarrow and Pau d'Arco and the essential oil containing each of Gotu Kola, Common Plantain, Figwort, Yarrow and Pau d'Arco;
mixing the melted beeswax and shea butter with the at least one of an oil and an essential oil; and
packaging the body butter.

BRIEF DESCRIPTION OF THE DRAWINGS

The invention will be more clearly understood from the following description of some embodiments thereof given by way of example only with reference to the accompanying drawings, in which:

FIGS. 1(a) to 1(h) are views of an old scarto which the topical healing composition according to the invention has been applied over time;

DETAILED DESCRIPTION OF THE INVENTION

Figure 2A:
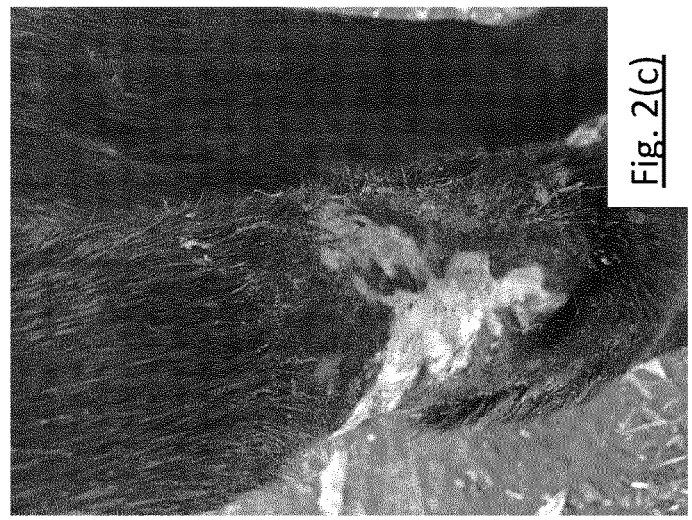
FIGS. 2(a) to 2(c) are views of a wound to which the topical healing composition has been applied over time.

The invention will now be more clearly understood from the following description of some embodiments thereof given by way of example only.

According to the invention, there is provided a topical healing formulation comprising a carrier base, preferably, petrolatum, having the following ingredients added thereto: (i) Gotu Kola (*Centella asiatica*); (ii) Common Plantain (*Plantago major*); (iii) Figwort (*Scrophularia nodosa*); (iv) Yarrow (*Achillea millefolium*); and (v) Pau d'Arco (*Tabebuia impetiginosa*). The topical healing formulation is suitable for application directly to a wound or other skin disorder. The topical healing formulation may be applied once, twice, thrice daily or more frequently as required. Wounds and skin disorders begin to show improvement after one or more applications.

The herbal formulation may be prepared in a number of forms such as ointment, cream/crème, essential oil, powder, oil and body butter and suitable methods of preparation of these herbal formulations are provided in the following examples. These are given by way of illustration only and should not be construed as limiting the subject matter of the invention.

Example 1: Preparation of an Ointment

White soft paraffin was obtained and melted under a low heat until it liquefied. Roughly chopped dried leaves of Figwort, Common Plantain, Pau d'Arco, Gotu Kola and Yarrow were obtained and were added to the liquefied white soft paraffin in the amounts given in tables 1(a) and 1(b) below to form an herbal mix. The herbal mix was maintained at a temperature of between 45° C. and 57.4° C. for between 3 and 96 hours to allow infusion and extraction to form an extracted mixture. The herbal leaves were drained from the extracted mixture and the extracted mixture was placed in a container where it was gently sealed and allowed to cool to form the ointment. The ointment was then packaged.

TABLE 1(a)

| Composition of Ointment: | |
| --- | --- |
| Figwort | 60 g |
| Common Plantain | 60 g |
| Yarrow | 60 g |
| Pau d'Arco | 60 g |
| Gotu Kola | 60 g |
| White Soft Paraffin/Petroleum Jelly | 500 g |

TABLE 1(b)

| Composition of Ointment: | |
| --- | --- |
| Component | Amount (% w/w) |
| Pau d'Arco | 7.5 |
| Common Plantain | 7.5 |
| Figwort | 7.5 |

TABLE 1(b)-continued

| Composition of Ointment: | |
| --- | --- |
| Component | Amount (% w/w) |
| Yarrow | 7.5 |
| Gotu Kola | 7.5 |
| Petrolatum | 62.5 |

An alternative ointment comprises 2500 g white soft paraffin infused with 60 g each of Figwort, Common Plantain, Pau d'Arco, Gotu Kola and Yarrow. The chopped herbs were added to the liquefied white soft paraffin to form a herbal mix. The herbal mix was maintained for at least 96 hours to allow infusion and extraction to form an extracted mixture. The herbal leaves were drained from the extracted mixture and the extracted mixture was placed in a container where it was gently sealed and allowed to cool to form the ointment. The ointment was then packaged.

Example 2: Preparation of a Crème

Silcock's base was obtained and an herbal tincture of each of Figwort, Common Plantain, Yarrow, Gotu Kola, Pau d'Arco was obtained and was added gradually to the silcock's base in the amounts given in tables 2(a) and 2(b) below to form an herbal mix.

The herbal mix was mixed slowly so as not to add any air until the herbal mix reached a smooth consistency and formed a crème. The crème was then transferred to containers and sealed.

TABLE 2(a)

| Preparation of a Crème: | |
| --- | --- |
| 150 ml | Tincture or Oil or combination of both |
| 500 g | Silcox Base or Aqueous Crème |

TABLE 2(b)

| Composition of Crème: | |
| --- | --- |
| Component | Amount (% w/w) |
| Pau d'Arco | 4.6 |
| Common Plantain | 4.6 |
| Figwort | 4.6 |
| Yarrow | 4.6 |
| Gotu Kola | 4.6 |
| Silcox Base or Aqueous Crème | 77 |

Example 3: Preparation of an Essential Oil

Roughly chopped leaves of dried Common Plantain, Figwort, Pau d'Arco, Gotu Kola and Yarrow were obtained and were added to water in the amounts given in table 3 below to form an herbal mix. The herbal mix was maintained at room temperature for between 3 hours and 3 weeks to allow infusion and extraction to form an extracted mixture. The herbal leaves were drained from the extracted mixture to leave oil, and the remaining oil was packaged. Alternatively, the essential oil(s) of fresh or dried leaves can be extracted using a steam distillation process or a wax extraction process.

TABLE 3

| Composition of Essential Oil: | |
| --- | --- |
| Component | Amount (% w/w) |
| Pau d'Arco | 4.6 |
| Common Plantain | 4.6 |
| Figwort | 4.6 |
| Yarrow | 4.6 |
| Gotu Kola | 4.6 |
| Water | 77 |

Example 4: Preparation of a Powder

Common Plantain, Yarrow, Figwort, Gotu Kola, Pau d'Arco were obtained in powder form and were added to arrowroot. Alternatively, slippery elm could be used as the base carrier and is considered the preferred base to form an herbal mix. The powders are then thoroughly mixed together and then the powder is packaged.

Example 5: Preparation of Oil

Roughly chopped dried leaves of Common Plantain, Pau d'Arco Yarrow, Figwort, Gotu Kola and Yarrow were obtained and were placed in a container. The leaves were covered with jojoba oil to form an herbal mix. The herbal mix was maintained at a temperature of between 12° C. and 24° C. for at least 3 weeks to allow infusion and extraction to form an extracted mixture. The herbal leaves are drained from the extracted mixture to leave oil and the remaining oil was packaged.

Example 6: Preparation of Body Butter

Beeswax and Shea butter are melted slowly over a low heat, oil and/or essential oils are added and beaten slowly and well. The herbal mix was then turned out into containers and packaged.

In the methods of preparation of the above formulations, it is possible to commercially obtain the herbal leaves in roughly chopped, cut and dried or powder form, tincture and oil. Alternatively, the leaves can be chopped up or ground down using any well known chopping or grinding instrument. It is also possible to obtain herbal tinctures commercially for each of the individual herbs. A tincture is an herb extract prepared by steeping herbs in alcohol (vodka 40% for aerial parts, ethanol for woody parts) for several weeks. The general ratio for herb to alcohol in a tincture is 4:150 however, this can vary.

In the preparation of the ointment, infusion and extraction can take in the region of between 3 and 96 hours, and at a temperature in the region of 57.4 degrees Celsius.

The ointment has been found to be particularly suitable in treating wounds and general skin disorders. The ointment however can also be packaged in the form of a lip balm and has found to be particularly effective in treating and soothing chapped lips. In the preparation of an ointment for lip balm, Lavender, *Echinacea* and Lemon Balm can be added. It is also possible to prepare a lip-gloss using the same method as the ointment but substituting the white soft paraffin or petroleum jelly with paraffin gel, to provide a glossy look and consistency.

The herbal formulations have been found to be particularly suitable for open wounds and general skin disorders, but have also been found to treat napkin/nappy/diaper rash, bedsores, and eczema, surface wounds, suppurating and discharging wounds. It has been found that by applying the ointment formulations to the human skin of a baby each time the baby's nappy is changed, that this will clear up napkin rash within three nappy changes. In animals, it has been found that by applying the ointment preparation of either once a day, twice a day—morning and evening, or once every two, three or four days, that wounds will clean prior to healing. Following the cleaning phase of the ointment, tissue regeneration and hair re-growth in animals become evident within a 48 hr to 72 hr period.

In humans, it has been found that by applying the crème, oil, or body butter preparation twice a day—morning and evening, that general skin disorders such as eczema, dermatitis, very dry skin and cracked skin clear up. It was further found that the Sangre De Grado eliminates bleeding upon contact. The formulations are particularly suitable for individuals who suffer from allergies, as they do not comprise of any chemicals many of which are allergens.

The ointment formulations prepared have a shelf life of 30 months upon Stability testing. The ointment does not require a challenge test as aqua is not present in the formula and in addition, the formula does not require the use of any types of preservatives or stabilisers—natural, edible, or synthetic.

If a preservative or a stabiliser is to be provided, it is envisaged that two preservatives can be used in combination to stabilize the formula. If possible, previously stabilized and even food grade sources will have been used to avoid the need for further stabilisers and preservatives. However, for example, if non-stabilised/preserved *Aloe vera* gel is used, the formula is likely to develop a mould growth over time. If stabilised/preserved *Aloe vera* is used, such as *Aloe babandis* miller that has previously been stabilized, the formula shouldn't develop mould but it will have to undergo a challenge test if there is aqua present in the formula.

One preservative that may be used with the present formulations is Vitamin E. Vitamin E contains natural antioxidants which extend the life of the products. Gamma tocopherol, a component of Vitamin E, is a great antioxidant for protecting cosmetic formulations. T-50 has a larger amount of gamma tocopherols than other forms of Vitamin E oil. While the alpha tocopherol in the 250, 1000, and 1400 IU/g oils is useful as an in vitro antioxidant, studies show that the gamma tocopherol in the Vitamin E T-50 oil is a better antioxidant for oils/lipids in cosmetic formulations. T-50 has a higher content of gamma tocopherols and can be used at a rate of 0.04% or 400 ppm to adequately protect formulations.

Another preservative that may be used is Grapefruit Seed Extract (GSE). Grapefruit Seed Extract is a citrus seed based anti-microbial used as a preservative in skin care products. GSE is made with the extracts of citrus seeds and pulp. It is blended with vegetable glycerin to make it non-irritating to the skin and mucous membranes when used in formulations. GSE is even safe enough to use as a disinfectant for drinking water when necessary. Grapefruit Seed Extract may be used at professional strength, more specifically it is 60% GSE in 40% vegetable glycerine, rather than the usual 33% found elsewhere. GSE has a shelf life of 7-9 years and it is said to be anti-microbial, anti-septic, anti-bacterial, astringent and does also have some antioxidant activity. The GSE is used at 0.5 to 1% by weight to preserve most formulations, but may be used at 2% by weight of the formulation to create anti-bacterial creams, salves, rinses and soaps.

The formulations consisting of Silcox (Silcock's) Base or Aqueous crème have a shelf life of 3 to 12 months, providing the lid is replaced after each use or an airless pump is used as the end delivery system, as exposure to air turns the formulation brown, but does not appear to impinge on the potency. A challenge test would be required and a stability test to determine mould, yeast or bacterial growth, and or degeneration of potency and consistency of formula.

*Tabebuia impetiginosa* has been found to be the most suitable type of Pau d'Arco as its active constituents appears to be more potent. *Scrophularia nodosa* is the most potent form of Figwort and thus has been found to be the most suitable. It will be understood that other, less potent forms of Pau d'Arco or Figwort could be used to good effect and may be used depending on availability. Although other herbal agents such as Evening Primrose oil, Safflower oil, and Marigold (*Calendula officianilis*) can be added to the herbal formulation, Borage (*Borago officianilis*) has been found to be particularly effective as it has a higher GLA content. The GLA content of a component is defined as the amount of γ-linolenic acid contained therein. GLA is an omega-6 essential fatty acid extracted from the oil seed and has been identified as having several beneficial properties. *Echinacea augustifolia* is the more potent of *Echinacea pallidum* and *Echinacea purpurea* and therefore is seen as preferred when added to the formulation. Borage is not used in preparations for horses.

Ideally, the carrier base is in the amount of between 52% and 95% by weight of the formulation. Preferably, the carrier base is selected from the group comprising one or more of emollient, white soft paraffin/petroleum jelly (petrolatum), Silcox (Silcock's) base, Aqueous crème, paraffin gel, water, oil, Shea butter, coconut butter, Sangre de Grado (Dragons Blood) resin, thickener, stabilizers, essential oils, and preservatives. Further, preferably, the oil is selected from the group comprising one or more of Olive oil, Jojoba oil, Almond oil, Argon oil, Avocado oil, Grape Seed Oil, Sesame Oil, Coconut oil, Borage oil and Safflower oil. Preferably, the thickener is selected from the group comprising one or more of baking powder, flour, arrowroot and slippery elm.

The herbal formulation according to the invention is deemed suitable for use as a therapeutic and/or cosmetic composition for the treatment of tissue regeneration without introduction of an extracellular matrix synthetic, silk or natural. It may be used to regenerate the dermal sheath, repopulate dermal papilla and modulate hair type without introduction of synthetic or induced mesenchymal stem cell epithelial progenitors. Furthermore, the formulation is deemed suitable to treat serious de-gloved soft tissue injuries in horses by regenerating and promoting vascularisation, elastin content and follicle structures without development of granuloma and suitable to treat hairless scars, and general skin disorders from cuts, abrasions to dermatitis in bloodstock. On human skin it should be noted, that tissue regeneration does not occur, nor are follicular impediments altered in a positive way.

The formulation according to the present invention was tested on a number of animals with varying degrees of injury ranging from large wounds to small scars. The results of these tests are outlined in the case studies below along with accompanying photographic evidence as outlined in the accompanying drawings.

Case Study 1:

The ointment according to the invention was tested on a seven year old scar and the results of the use of the ointment are illustrated in FIGS. 1(*a*) to 1(*h*) inclusive. In FIGS. 1(*a*) to 1(*c*), the scar is shown prior to the application of the ointment. It can be seen that there is no pink colour in the scar, indicative of poor blood flow to the area. In FIGS. 1(*d*) to 1(*h*), there is shown views of the scar after one week, two weeks, three weeks, four weeks and five weeks respectively of frequent application of the ointment on the old scar. The pink marbling present in the hairless tissue indicates revascularisation. Once this tissue goes dark pink follicular regeneration begins. There is no other product on the market that can do this, namely vascularise old equine scars and regenerate a hair follicle.

Figure 2B:
Figure 2C:
Figure 3D:
FIGS. 3(a) to 3(j) are views of scaroids and a bite mark to which the topical healing composition has been applied over time.
Figure 3C:
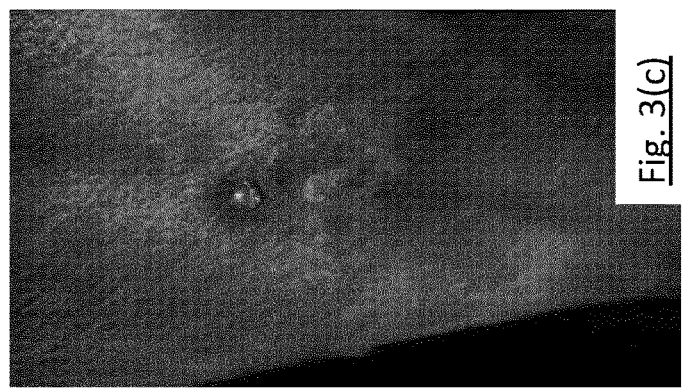
Figure 3B:
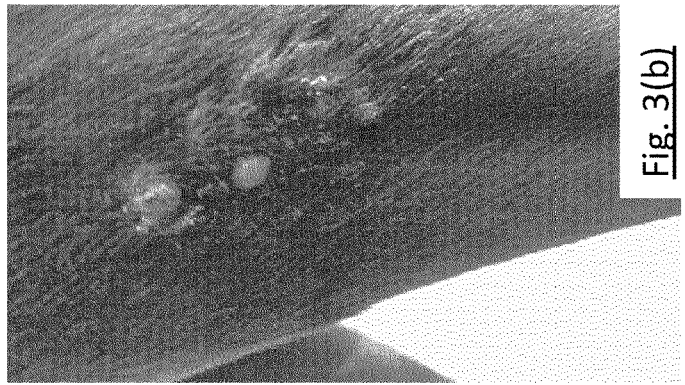
Figure 3A:
Figure 3G:
Figure 3F:
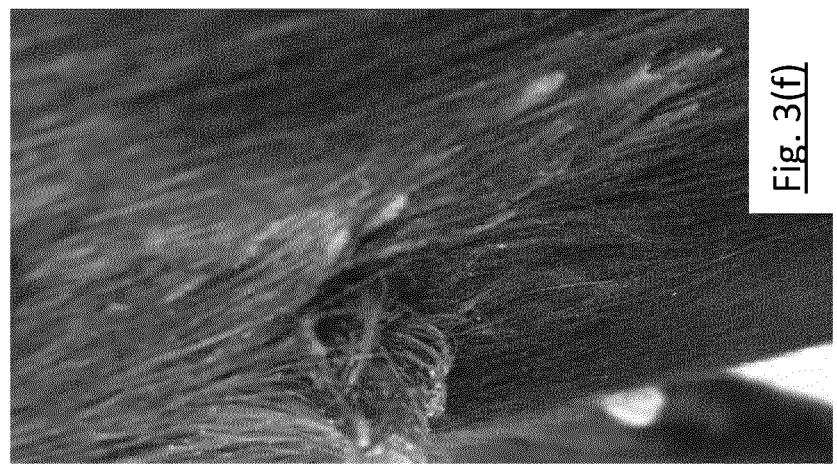
Figure 3E:
Figure 3J:
Figure 3I:
Figure 3H:
Figure 4A:
FIGS. 4(a) to 4(h) are views of a wound and scars to which the topical healing composition has been applied over time.
Figure 4B:
Figures 4C, 4D:
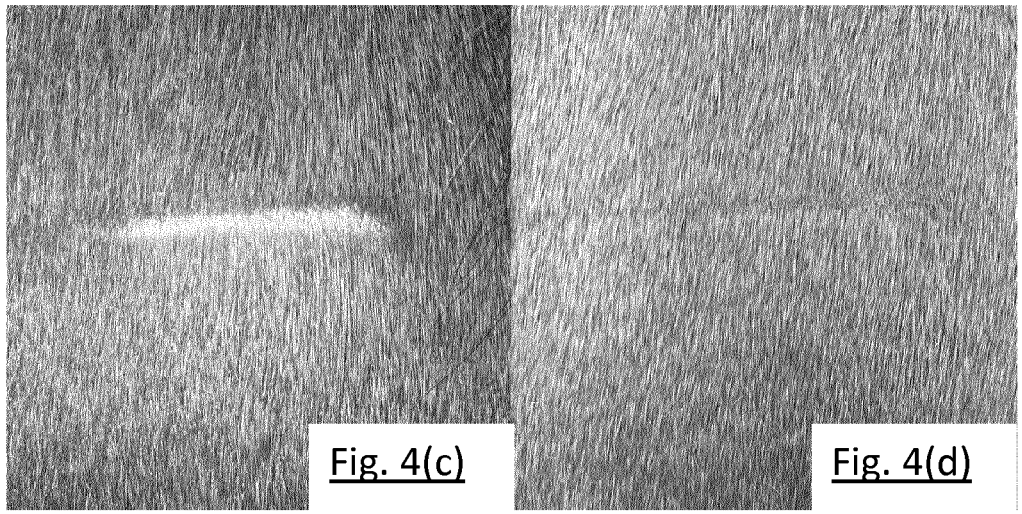
Figures 4E, 4F:
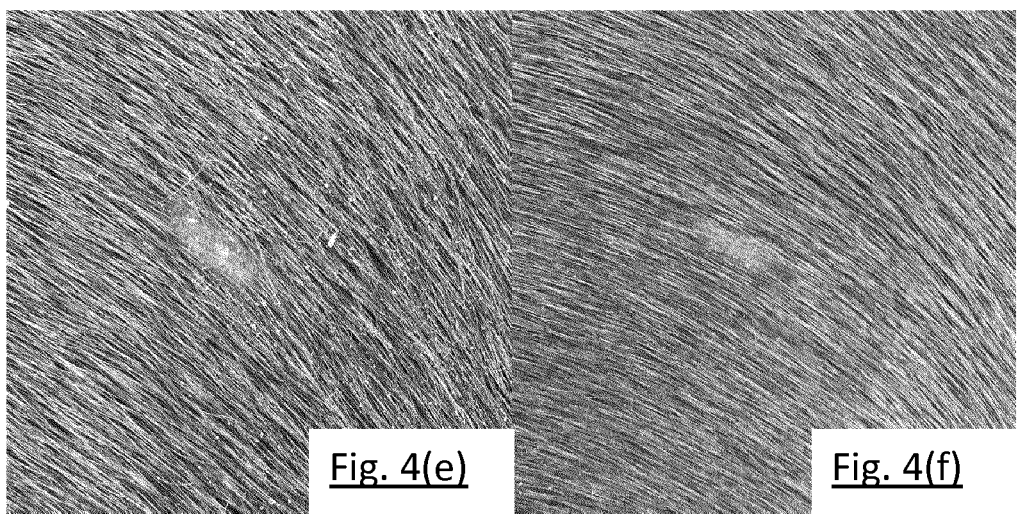
Figures 4G, 4H:
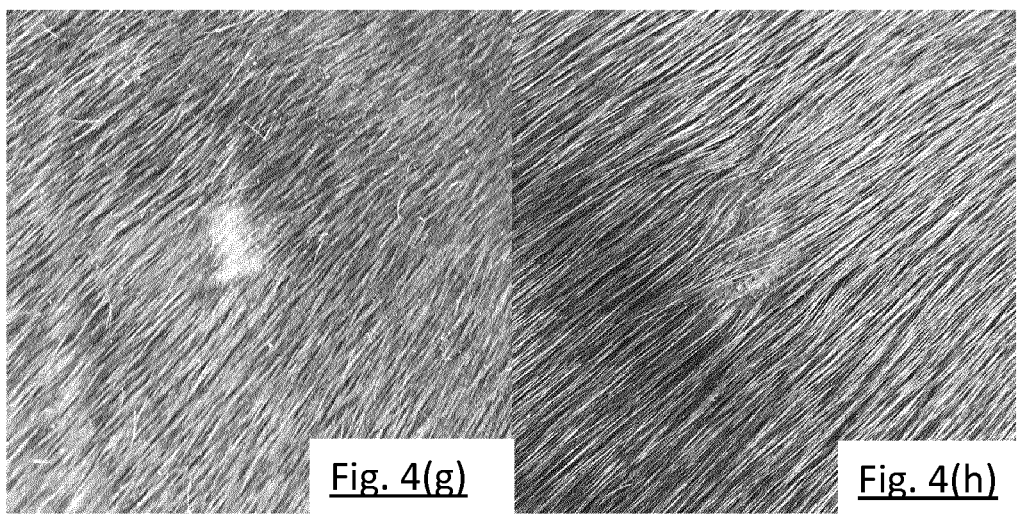

Case Study 2:

The ointment according to the invention was tested on an old injury from over 13 years ago that had recently been opened up. After numerous costly vet visits and bandaging for almost 12 months, the ointment according to the present invention was used on the wound. The initial wound is shown in FIG. 2(*a*) and the wound prior to treatment with the ointment according to the invention is shown in FIG. 2(*b*). The wound (as shown in FIG. 2(*b*)) was not entirely healed but since the application of the ointment according to the invention, great improvement has been observed and the wound is shrinking and healing (See FIG. 2(*c*)). The ointment is also keeping the wound moist to prevent any more ruptures. Healing is relatively slow as the horse in question is 30 years old and traditionally a very slow healer, Case Study 3:

A horse had a cluster of scaroids on his upper leg prior to treatment with the ointment according to the invention. After application of the ointment, the scaroids have completely gone and there are no signs of the scaroids coming back. The process took approximately 12-14 weeks from first application of the ointment to the final application. It is believed that the process would probably have taken less time if there was less hair in the way but it was not possible to clip the horse during treatment. The sequential progression of the wound from start of treatment to finish of treatment is shown in FIGS. 3(*a*) to 3(*g*). The horse also had a bite mark on his back from a horse over the fence that took approximately 6-8 weeks to be healed and back to full hair growth. The sequential progression of the bite mark wound from start of treatment to finish of treatment is shown in FIGS. 3(*h*) to 3(*j*) inclusive.

Case Study 4:

In FIGS. 4(*a*) to 4(*f*) there is shown a number of views of a rope burn wound and a number of scratches on a horse. In FIG. 4(*a*), the original rope burn wound can be seen and in FIG. 4(*b*), the same wound after three weeks of treatment with the ointment according to the invention is shown, it can be seen that the wound is almost healed after only three weeks. In this case, this was particularly advantageous as it meant that the horse was able to compete in an event that otherwise it would not have been able to compete in. A number of scratches are shown in FIGS. 4(*c*), 4(*e*) and 4(*g*) prior to treatment and the same scratches are shown in FIGS. 4(*d*), 4(*f*) and 4(*h*) respectively after three days of treatment with the ointment according to the present invention. It can be seen that there is significant improvement in the scars.

Figure 5A:
FIGS. 5(a) to 5(aa) are views of a wound to which the topical healing composition has been applied over time.
Figure 5B:
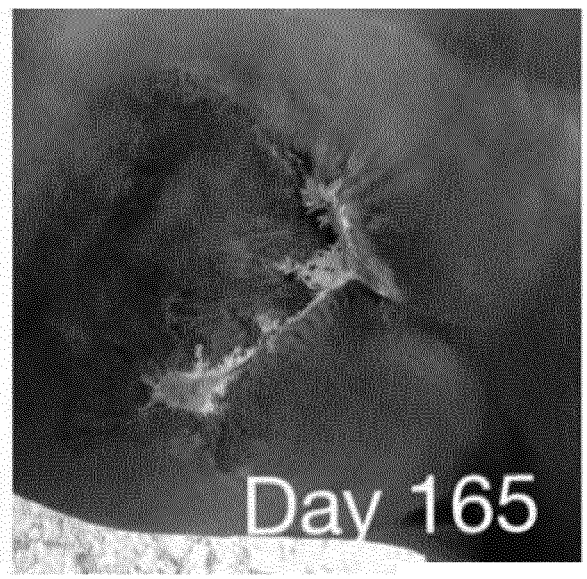
Figure 5C:
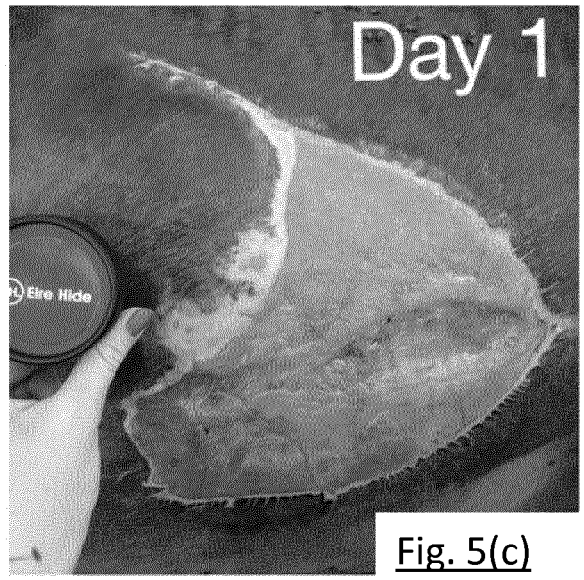
Figure 5D:
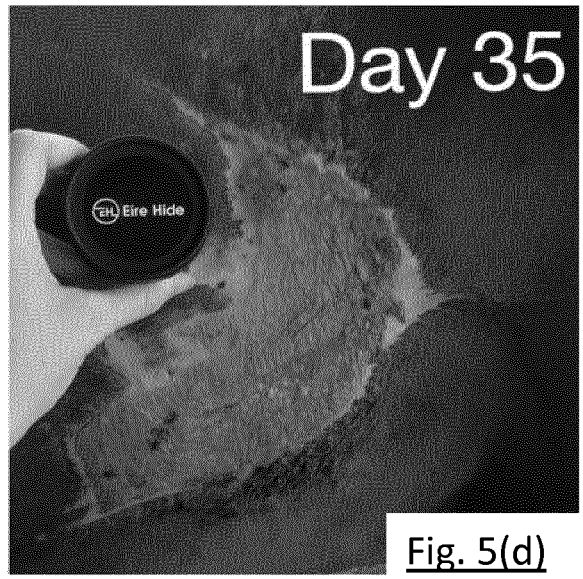
Figure 5E:
Figure 5F:
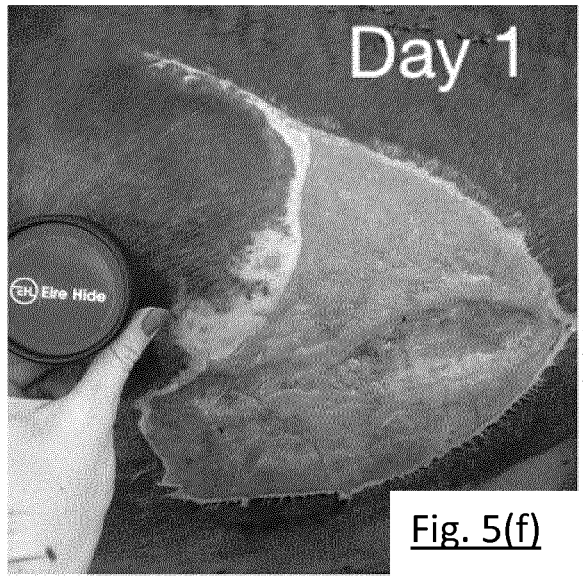
Figure 5G:
Figure 5H:
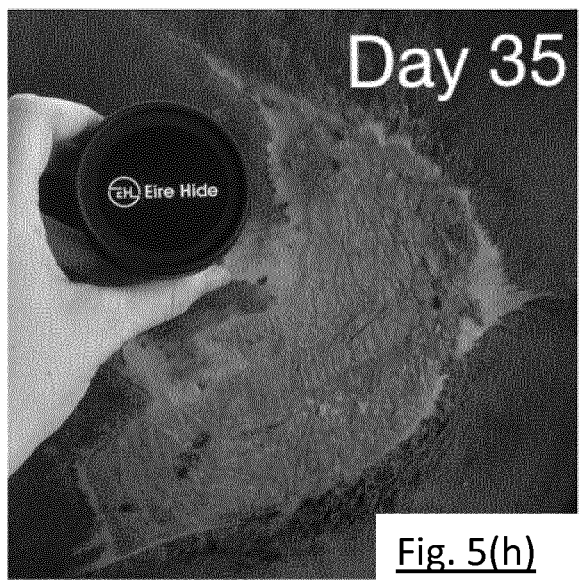
Figure 5I:
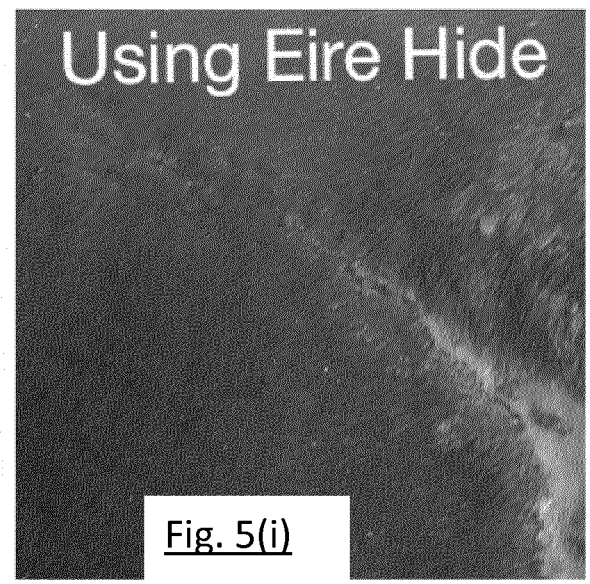
Figure 5J:
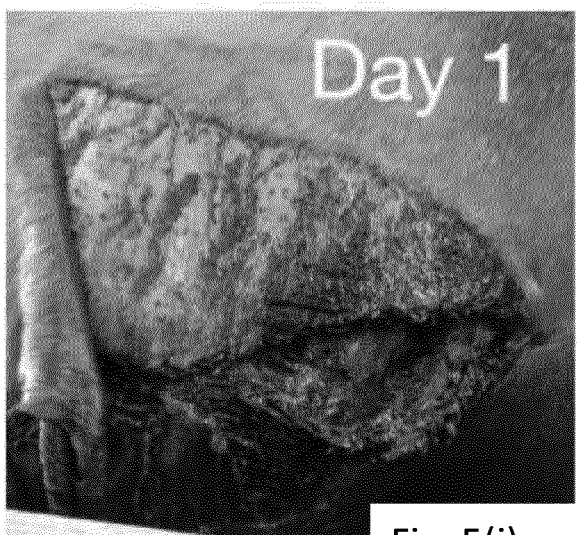
Figure 5K:
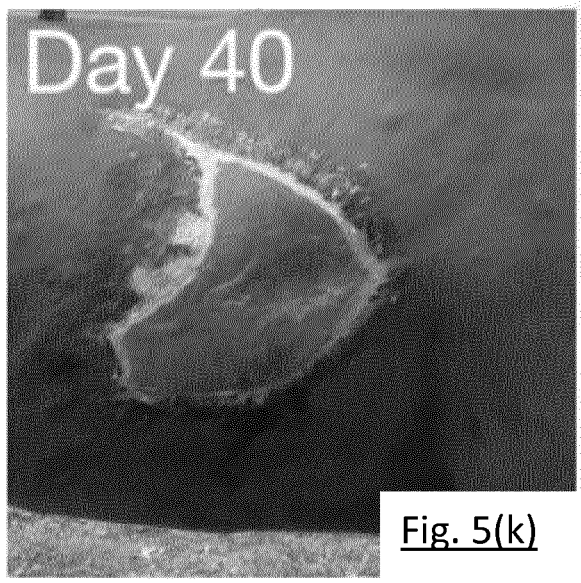
Figure 5L:
Figure 5M:
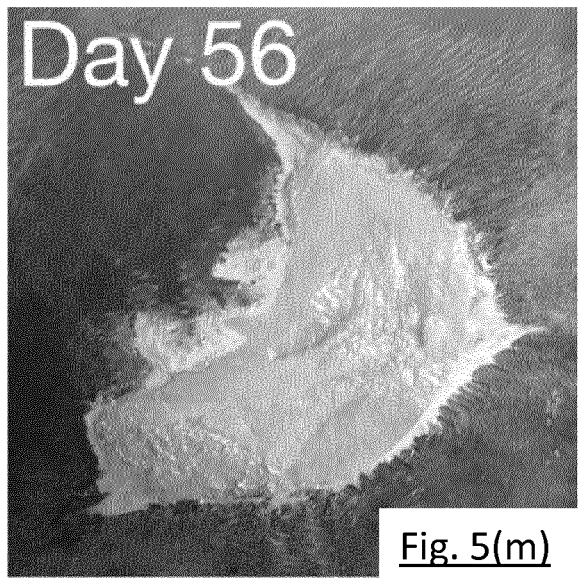
Figure 5N:
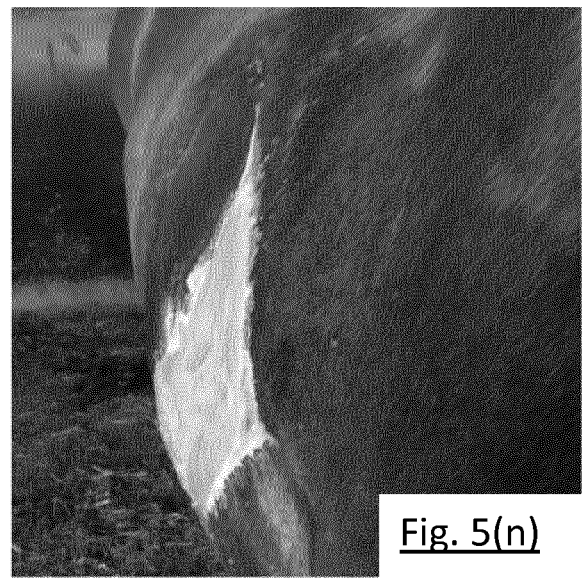
Figure 5O:
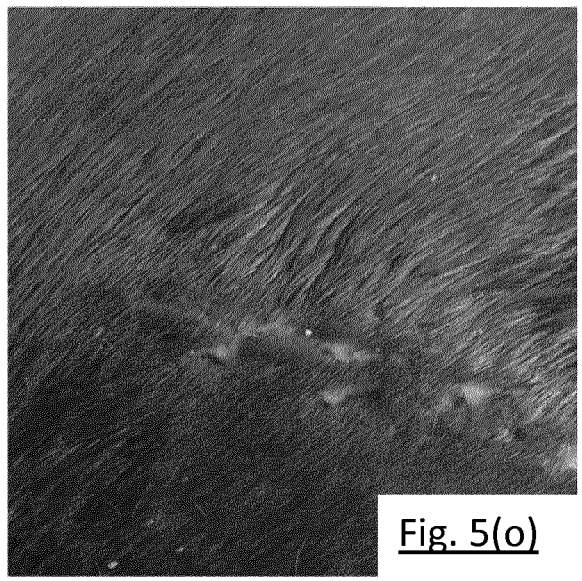
Figure 5P:
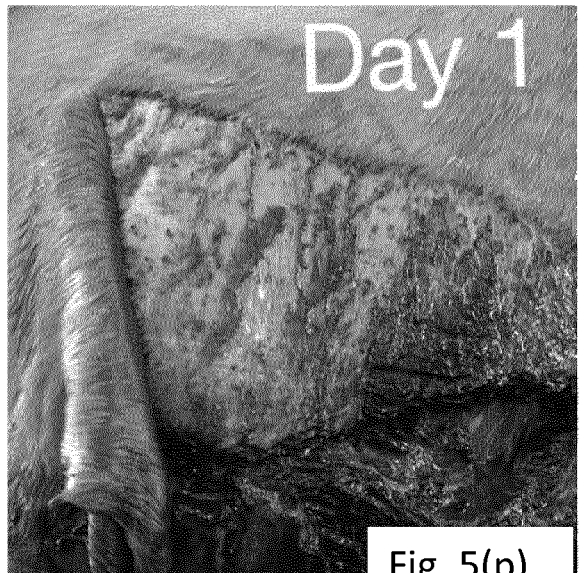
Figure 5Q:
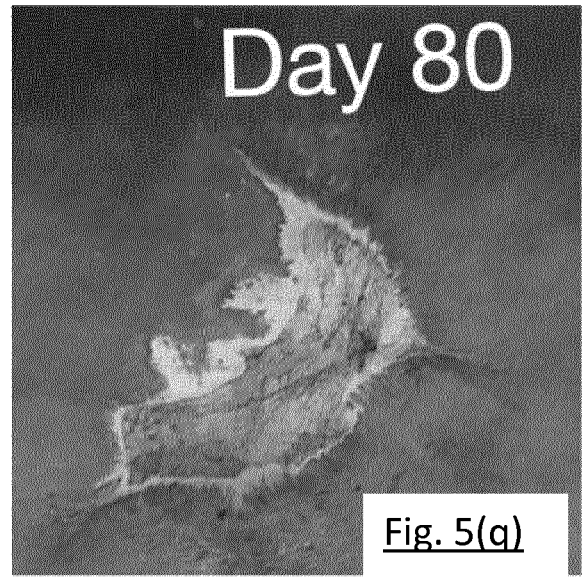
Figure 5R:
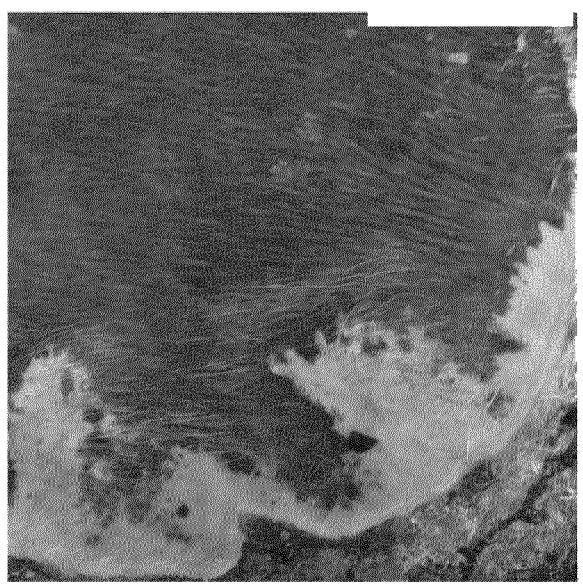
Figure 5S:
Figure 5T:
Figure 5U:
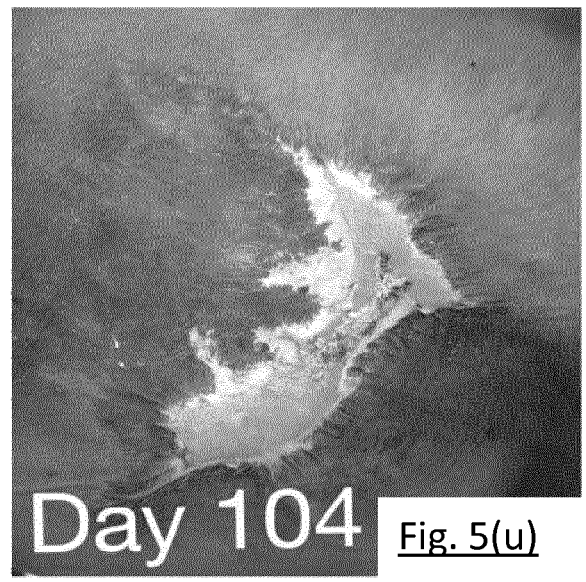
Figure 5V:
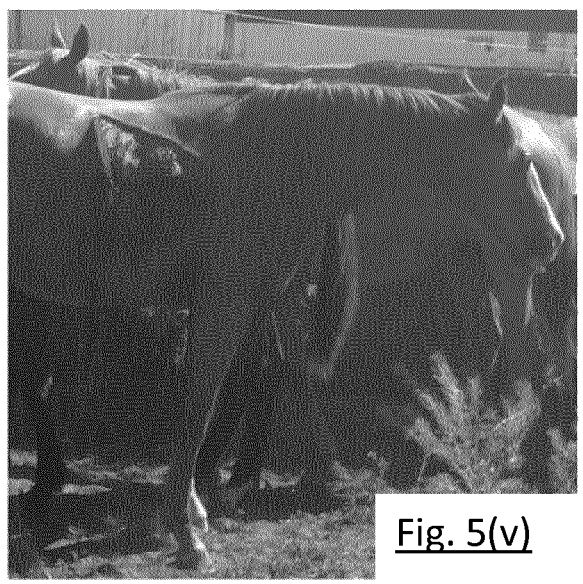
Figure 5W:
Figure 5X:
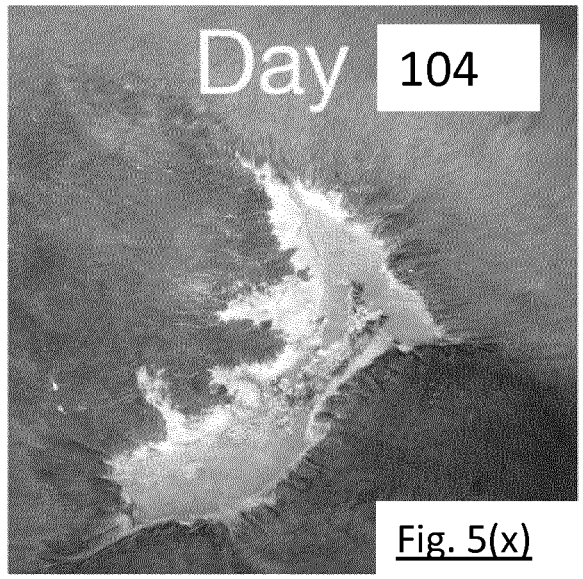
Figure 5Y:
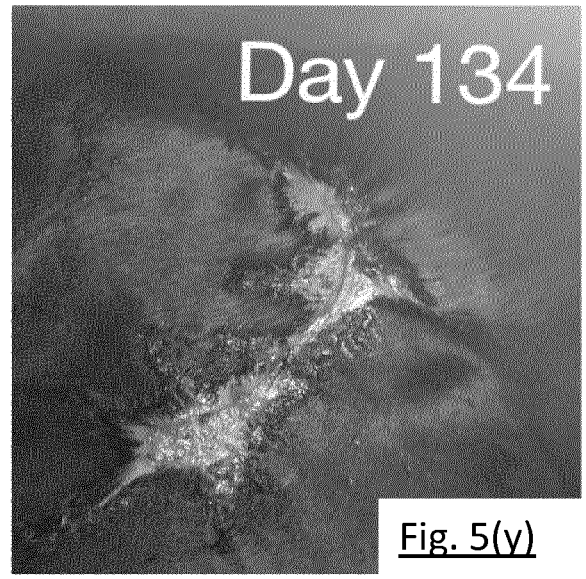
Figure 5Z:
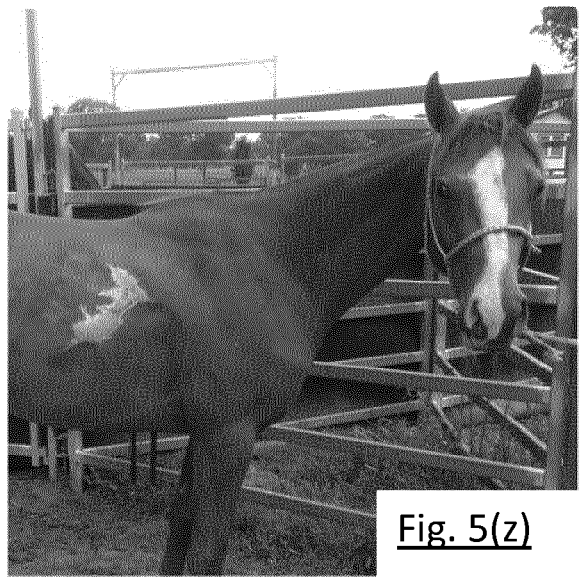
Figure 5:
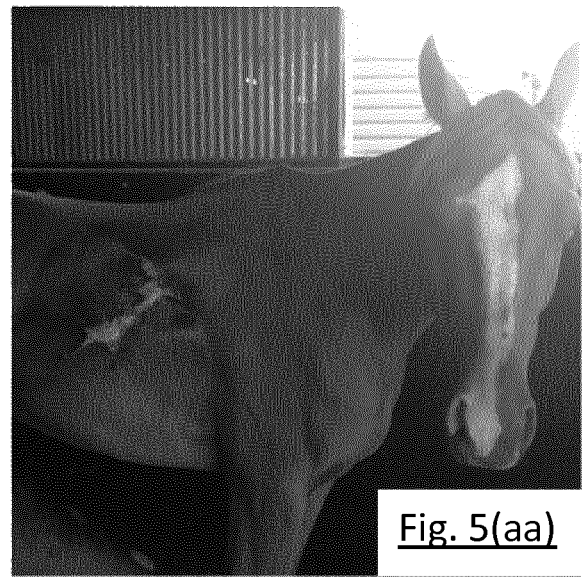

Case Study 5:

In FIGS. 5(*a*) to 5(*aa*), there is shown a number of views of a particularly gruesome wound suffered by a horse. It can be seen from FIGS. 5(*a*) to 5(*aa*), the progression of the treatment of the wound over time. FIG. 5(*a*) shows the wound prior to initiation of treatment and FIG. 5(*b*) shows the wound 165 days after treatment began. The horse was kept in a Hidez (Registered Trade Mark) compression suit for the first 31 days subsequent to the injury in order to help the healing process. On day 32, the Hidez suit was removed and application of the topical healing formulation according to the invention began.

Referring to FIG. 5(*c*), there is shown view of the wound prior to the first application of the topical healing formulation according to the present invention. Referring to FIGS. 5(d) and 5(e) respectively, there is shown views of the wound after 35 days and after 48 days of applying the topical healing formulation. FIGS. 5(f) to 5(i) show the progress of parts of the scar remote from the main wound site.

By day 40 after the initial injury, (i.e. the $6^{th}$ day of application of the topical healing formulation) the horse was placed in a light soft mesh rug to help protect the wound and the topical healing formulation was applied to the wound daily. The wound had been producing a lot of fluid that builds up on the rug and this has been removed daily to allow the application of the topical healing formulation and to prevent blowfly strike. The wound continued to contract, further epithelial migration occurred and the muscle tissue continued to fill. The topical healing formulation kept the wound moist and was easy to apply. The application of the topical healing formulation is shown in FIGS. 5(k) and 5(l).

By day 56 (as illustrated in FIGS. 5(m) to 5(o)), the wound continued to heal well. For the preceding 16 days, the topical healing formulation was applied every second/third day. There has been a large amount of epithelial migration and wound contraction has continued. This week hair has started to grow back along the top of the wound and in from the back of the wound.

By day 67, the horse's carers have been applying the topical healing formulation every 2-3 days. Hair and skin growth has been impressive. The horse's carers have been letting the horse have short amounts of time out of her rug between applications and the wound appeared the be drier than usual. Under the 'scab', it was observed that the flesh was very healthy and fresh. The epithelial migration and wound contraction continued to impress.

By day 80 (as illustrated in FIGS. 5(p) to 5(s)), the wound continued to heal well. The topical wound healing formulation according to the invention has been applied every third day for the preceding two weeks and this has seen further skin and hair growth. The rate at which the skin and hair are growing continues to impress.

By day 104 (as illustrated in FIGS. 5(u) and 5(w)), the wound continued to heal well. the topical wound healing formulation has been applied to the wound daily and as a consequence, the carers for the horse continued to see significant contraction of the wound and significant hair growth around the wound edges. As the photos show, the overall healing of the wound has been remarkable.

By day 134 (as illustrated in FIGS. 5(y) and 5(aa) compared alongside FIGS. 5(x) and 5(z) showing the wound after day 104), the wound continued to heal very well. By day 134 the horse is looking well. The horse's carers have been applying the topical healing formulation according to the invention daily and continue to see improvement every day. They have removed the horse's rug and she is spending her days in the stable out or the sun and nights out in her paddock. The carers have been applying the topical healing formulation quite thickly and by doing so the topical healing formulation is keeping the wound moist and encouraging skin and hair growth.

By day 164, the horses owners have continued to apply the topical healing formulation according to the invention to the wound daily. The pink skin is slowly turning dark and small hair follicles are forming over the scar. The top line of the original injury and the front and bottom lines are barely visible anymore.

Figure 6A:
FIGS. 6(a) to 6(f) are views of a wound and scar to which the topical healing composition has been applied over time.
Figure 6B:
Figure 6C:
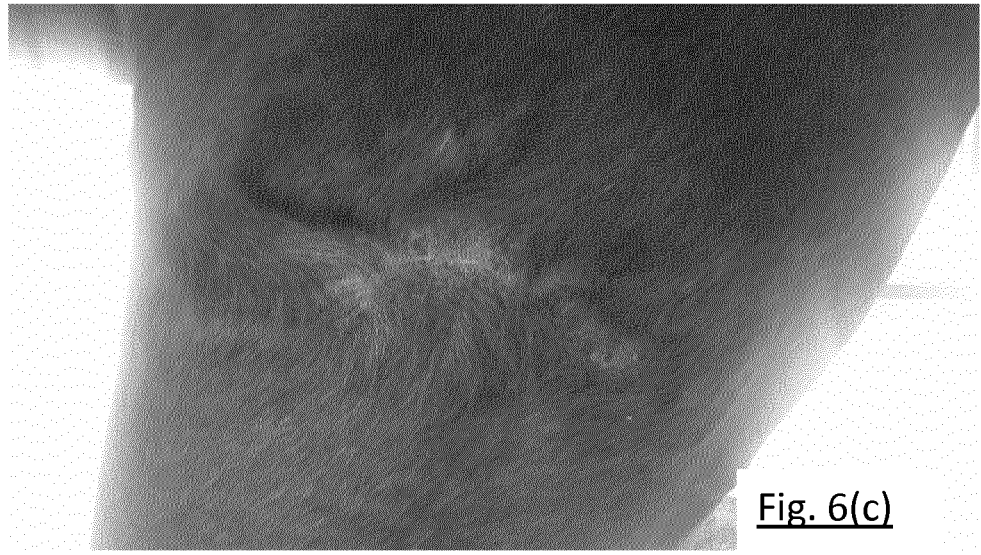
Figure 6D:
Figure 6E:
Figure 6F:
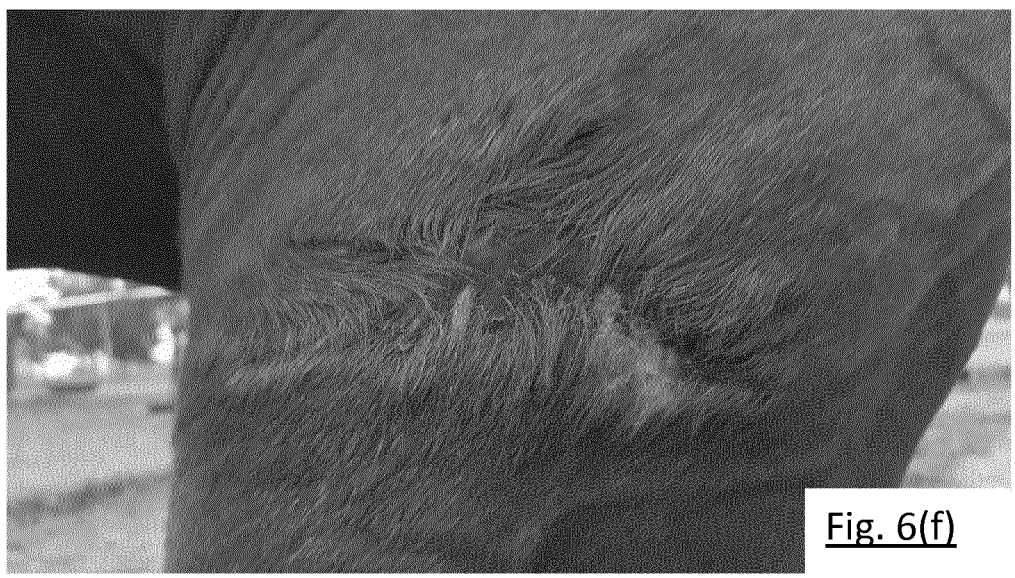

Case Study 6:

Case study 6 illustrates the use of the topical healing formulation according to the invention on a horse with a scar and a lump that has been removed. There was a large lump over a even larger scar from a prior injury site (as illustrated in FIG. 6(a). The scar nearly reached across the horse's entire upper foreleg. The unsightly lump was surgically removed by a vet. The scar from this surgery was very minimal, as illustrated prior to initial healing in FIG. 6(b) and after initial healing in FIG. 6(c). The original injury scar was at least 4 years old and the owner previously tried many options in an attempt to reduce the old scar and get some hair growth since it was quite visible. There was no success with any of the other offerings that were tried. The owner tried the topical healing formulation according to the present invention and it softened the old scaring up, smoothed it out and promoted hair. FIG. 6(d) shows the scar one week after treatment with the topical healing formulation according to the present invention began. Note how the scar has softened. FIG. 6(e) shown progress a short while later in which the area is now smooth, there is hair growth along the edges and hair forming in patches. FIG. 6(f) is taken a short while later still and there is pink marbling coming through the scar on the right, indicative of increased blood circulation to the area.

The carer for the horse shown in FIGS. 6(a) to 6(f) also put the topical healing formulation according to the invention on an old fetlock scar (not shown) that was raised and had and that scar was able to be peeled back after only three days of application of the topical healing formulation. Several other products had been tried to remove the fetlock scar with no success prior to the use of the topical healing formulation according to the invention.

Figure 7A:
FIGS. 7(a) to 7(i) are views of a wound to which the topical healing composition has been applied over time.
Figure 7B:
Figure 7C:
Figure 7D:
Figure 7E:
Figure 7F:
Figure 7G:
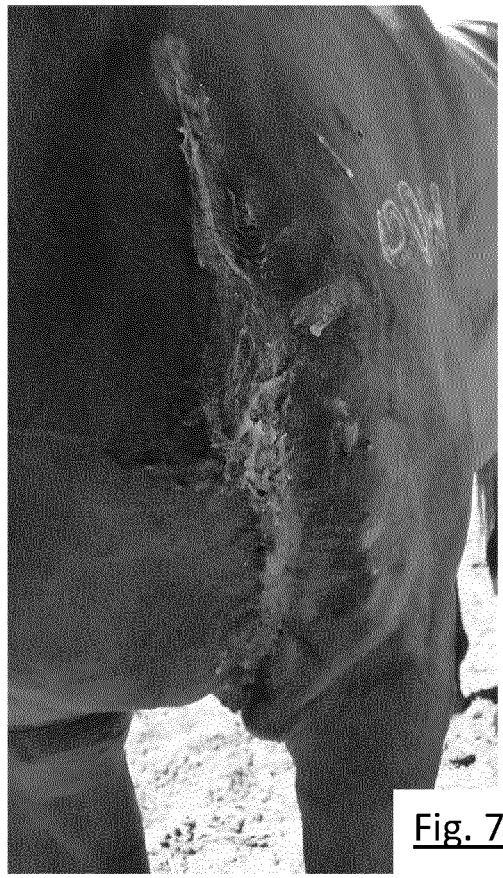
Figure 7H:
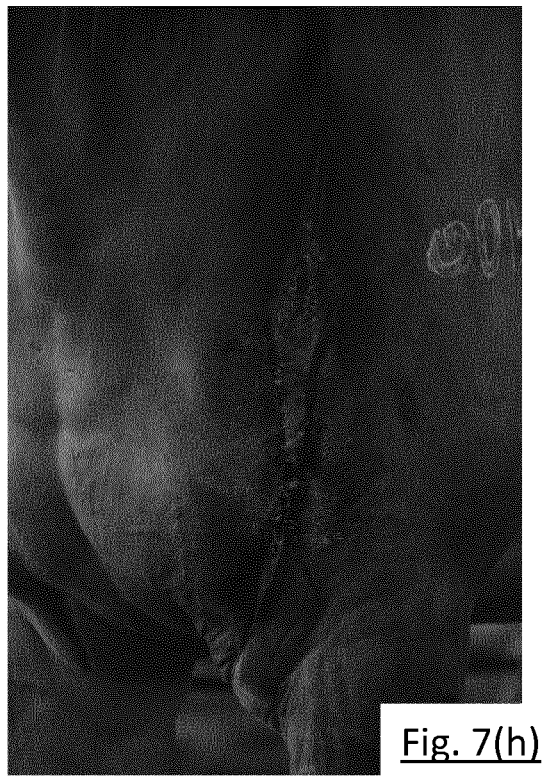
Figure 7I:

Case Study 7:

Another particularly serious injury to a horse is shown in FIGS. 7(a) to 7(i) inclusive. FIG. 7(a) shows the initial injury, which happened on the 15 Nov. 2015. First of all, a Hidez® suit was placed on the horse on the 18 Nov. 2015. FIG. 7(b) is a view taken two weeks after the Hidez® suit had been put on and FIG. 7(c) illustrates the wound 6 weeks after the Hidez® suit was first put on and was still in use. The Hidez® suit was removed approximately one week later and a satin lined summer sheet was put on the horse. The Hidez® suit was used with no further topical treatment other than rinsing with the hose and antibiotics orally (2 courses). The Hidez® suit stayed on until the carer commenced treatment with the topical healing formulation approximately 8 weeks after the initial injury. FIG. 7(d) illustrates the condition of the wound 3 days after the Hidez® suit had been removed. Referring to FIGS. 7(e) to 7(i) inclusive, there is shown a number of sequential views of the wound after treatment with the topical healing formulation according to the invention over the course of 18 days. FIG. 7(e) illustrates the wound when the carers started applying the topical healing formulation. FIG. 7(i) shows the wound 18 days after treatment with the topical healing formulation commenced.

Case Study 8:

Case study 8 demonstrates the benefits of the topical healing formulation according to the invention on other animals, in this case, a dog. The topical healing formulation was used on a great dane/bull mastiff/wolfhound cross that had been suffering from flea and fly bite allergy dermatitis. Several other treatments including topical ointments, sprays and washes were tried to resolve the issue however none of those offerings proved successful. As a consequence, the dog continued to scratch herself excessively and her skin was very raw. After use of the topical healing formulation according to the invention for a limited period of time, the dog has almost completely stopped all scratching and her temperament has improved. Her skin is no longer raw and her hair is growing back relatively soft.

Case Study 9:

Case Study 9 further demonstrates the use of the topical healing formulation on a horse. The horse had an accident and as a result of which was left with scarring. The scars were over three years old prior to the use of the topical wound formulation according to the invention. The horse sustained serious injuries to both of her hind legs, as well as her off side hip, shoulder, ribs, cheek and knee and underwent seven months of treatment to heal the various wounds. The owner previously tried numerous different offerings in an attempt to heal the scars and promote hair growth including paw paw ointment, zinc and castor oil cream, bio oil, Cornucrescine, honey and many more ointments however none of these proved successful. The owner of the horse applied the topical healing formulation ointment to the horse's scars once (and sometimes twice) a day for a period of 9 weeks. After just 2 applications, the owner could see hair growing on the animal's cheek. The photos in FIGS. 8(a) to 8(s) show just how far the horse improved in only 9 weeks. It is possible to see the hair growing, the skin getting healthier and the hair follicles developing.

Figures 8G, 8H:
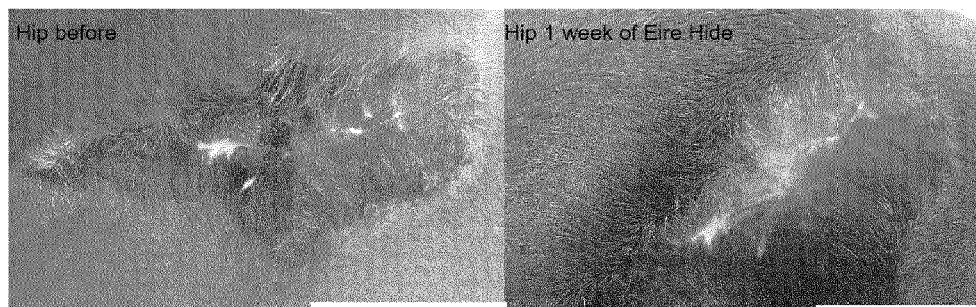
FIGS. 8(a) to 8(s) are views of scars to which the topical healing composition has been applied over time.
Figures 8I, 8J:
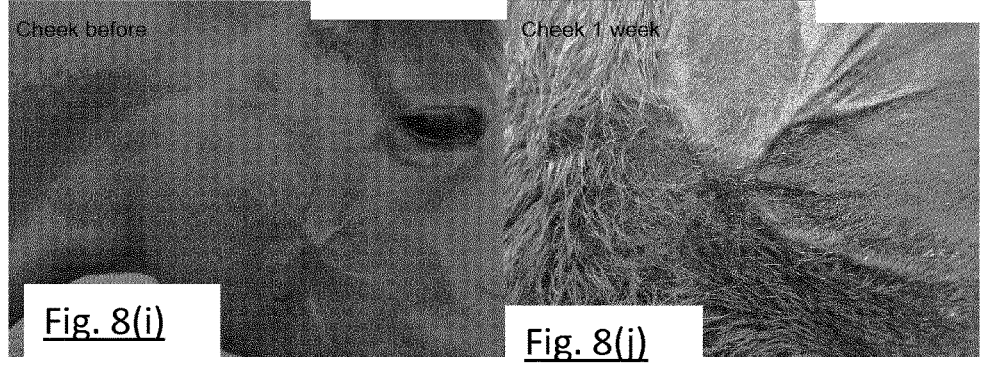
Figures 8K, 8L:
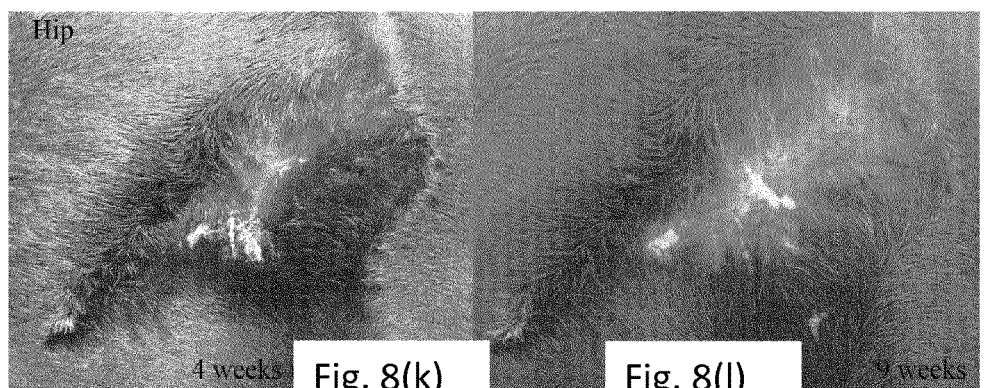
Figures 8M, 8N:
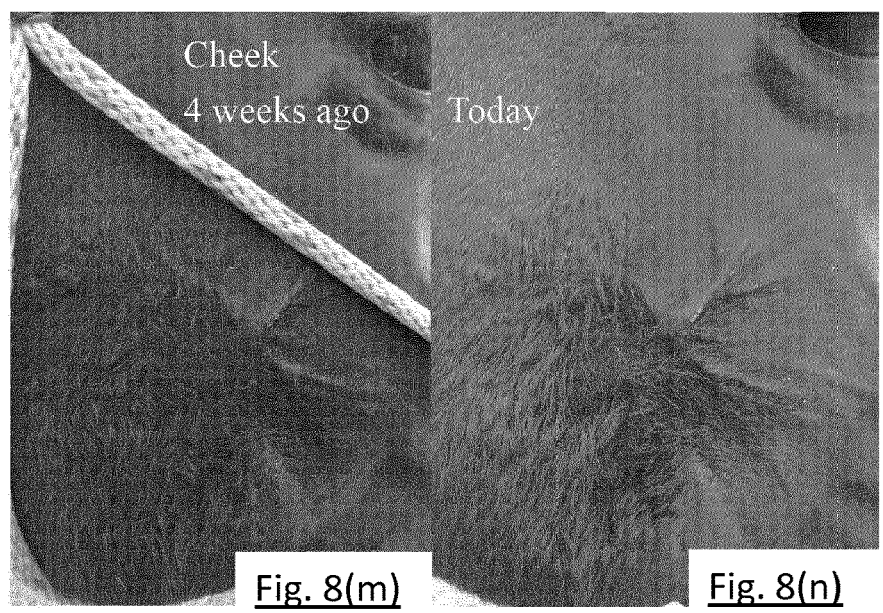
Figure 8O:
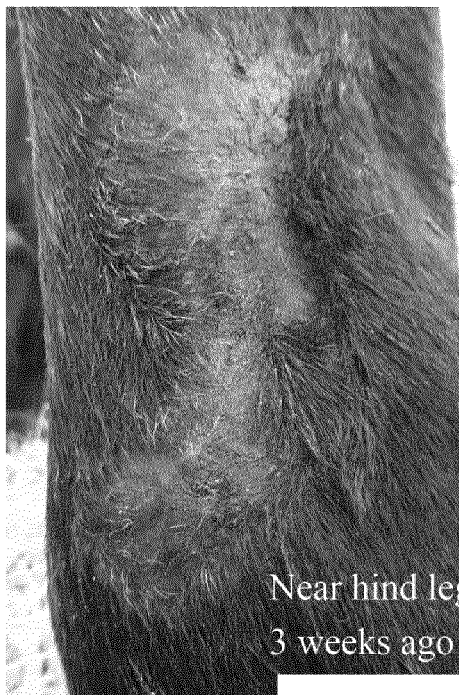
Figure 8P:
Figures 8Q, 8R, 8S:
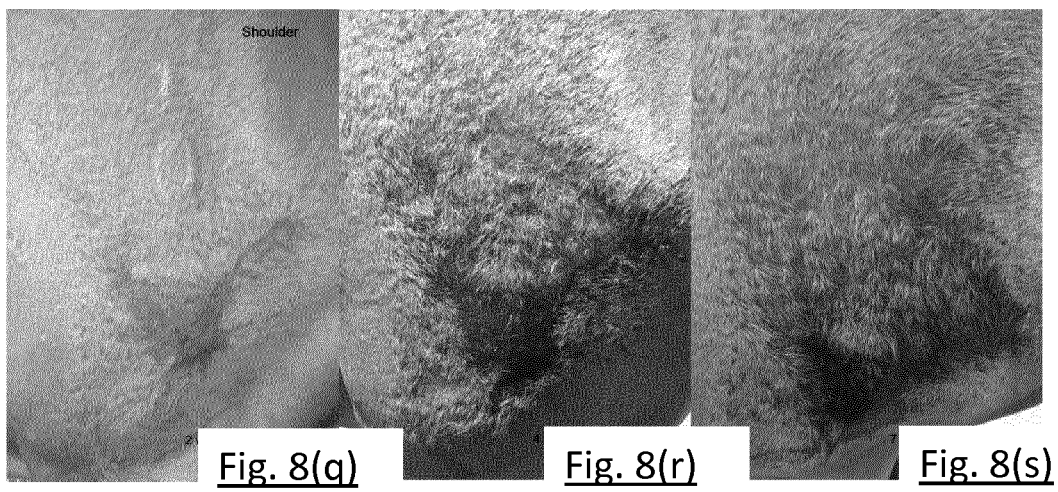

Referring to FIG. 8(a), there is shown a view of the horse prior to treatment. Referring to FIGS. 8(b) and 8(c), there is shown views of the horses neck scar 4 weeks and 9 weeks after treatment commenced. Referring to FIGS. 8(d) to 8(f) inclusive, there are shown views of the horses ribs taken 4 weeks, 7 weeks and 9 weeks after treatment began respectively. Referring to FIGS. 8(g) and 8(h), there is shown views of the horses hip before and one week after treatment commenced. Referring to FIGS. 8(i) and 8(j), there is shown views of the horses cheek before and one week after treatment commenced. Referring to FIGS. 8(k) and 8(l), there is shown some views of the horse's hip 4 weeks and 9 weeks after treatment commenced. Referring to FIGS. 8(m) and 8(n), there is shown views of the horses cheek showing the progress made over a period of 4 weeks. Referring to FIGS. 8(o) and 8(p), there is shown views of the horse's near hind leg and the progress made over a period of three weeks. Referring finally to FIGS. 8(q) to 8(s), there is shown a number of views taken 2 weeks, 4 weeks and 7 weeks after treatment began of the horses shoulder. Interestingly, it can be seen that hair has begun to grow back on the scarred areas.

Case Study 10:

It has been found that there is a synergistic effect achieved by combining the Gotu Kola, the Common Plantain, the Figwort, the Yarrow and the Pau d'Arco. Omission of one of the five main active ingredients results in significantly diminished results. A small batch of the topical healing formulation was made without the Figwort and with a relatively smaller amount of Pau d'Arco. The batch had similar quantities to the composition of ointment batch shown in Table 1(a) above but with no Figwort and no more than 20 g of Pau d'Arco. The results were significantly diminished and had little impact on the healing of wounds and scar tissue.

In this specification the terms "comprise, comprises, comprised and comprising" and the terms "include, includes, included and including" are all deemed totally interchangeable and should be afforded the widest possible interpretation. The invention is not limited to the embodiments hereinbefore described and may be varied in both construction and detail within the scope of the claims.

The invention claimed is:

1. A topical healing formulation for use in the treatment of one or more of hairless scars, degloving soft tissue injuries, dermatitis, abrasions, wounds, infected wounds, suppurating wounds, discharging wounds, burns, and skin disorders in affected skin of animals, the formulation comprising by weight percentage:
   (i) 1% to 12% Gotu Kola;
   (ii) 1% to 12% Common Plantain;
   iii) 1% to 12% Figwort;
   (iv) 1% to 12% Yarrow; and
   (v) 1% to 12% Pau d'Arco.

2. The topical healing formulation of claim 1 comprising, by weight percentage, between 6% to 10% Gotu Kola, between 6% to 10% Common Plantain, between 6% to 10% Figwort, between 6% to 10% Yarrow and between 6% to 10% Pau d'Arco.

3. The topical healing formulation of claim 1 further comprising, by weight percentage, 1 to 12% *Echinacea*.

4. The topical healing formulation of claim 1 further comprising, by weight percentage, 6 to 10% *Echinacea*.

5. The topical healing formulation of claim 1 further comprising, by weight percentage, between 1 to 12% Sangre de Grado from *Croton lechleri*.

6. The topical healing formulation of claim 1 comprising, by weight percentage, between 6 to 10% Sangre de Grado from *Croton lechleri*.

7. The topical healing formulation of claim 1 comprising one or more of the following oils: olive oil, jojoba oil, almond oil, avocado oil, argan oil, grape seed oil, rapeseed oil, sesame oil, coconut oil, borrage oil and safflower oil.

8. The topical healing formulation of claim 1 comprising one or more of the following thickeners: wheat flour, corn flour, baking powder, arrowroot and slippery elm.

9. The topical healing formulation of claim 1 comprising essential oils from one or more of the following: St John's wort, Goldenseal, Lemon Balm, chickweed, nettle, lavender, elderflower and Dragon's blood resin.

10. The topical healing formulation of claim 1 comprising an extract of one or more of the following antifungal agents: clove, tea tree oil and cinnamon bark.

11. The topical healing formulation of claim 1 further comprising *Aloe vera*.

12. The topical healing formulation of claim 1 in which the formulation is any one of the following: an ointment; a cream; a body butter; an essential oil; a powder; or an oil.

13. A method of using the topical healing formulation of claim 1 as a medicament, the method comprising applying the medicament to the affected skin.

14. A method of using the topical healing formulation of claim 1 comprising applying the topical healing formulation to the affected skin.

15. A method of using the topical healing formulation of claim 1 in the manufacture of a cosmetic product, the method comprising incorporating the topical healing formulation in a cosmetic composition for treatment of tissue regeneration.

16. A process for producing a topical healing ointment for use in the treatment of one or more of hairless scars, degloving soft tissue injuries, dermatitis, abrasions, wounds, infected wounds, suppurating wounds, discharging wounds, burns, and skin disorders in animals, the process comprising the steps of:
   melting a carrier base of petrolatum;
   adding dried leaves of Gotu Kola, Common Plantain, Figwort, Yarrow and Pau d'Arco each at 1% to 12% by weight prior to extraction to the melted carrier base;

maintaining the mixture at a temperature of between 45° C. to 58° C. for between 3 to 96 hours;
filtering the mixture to remove the leaves;
placing the filtered mixture in a container which is then sealed; and
allowing the filtered mixture to cool to an ointment.

17. A process for producing a topical healing essential oil for use in the treatment of one or more of hairless scars, degloving soft tissue injuries, dermatitis, abrasions, wounds, infected wounds, suppurating wounds, discharging wounds, burns, and skin disorders in animals, the process comprising the steps of:
adding roughly chopped leaves of each of Gotu Kola, Common Plantain, Figwort, Yarrow and Pau d'Arco each at 1% to 12% by weight prior to extraction to water;
leaving the mixture to stand for between 3 hours and 3 weeks;
filtering the mixture to remove the leaves; and
placing the filtered mixture in a container which is then sealed.

18. A process for producing a topical healing essential oil for use in the treatment of one or more of hairless scars, degloving soft tissue injuries, dermatitis, abrasions, wounds, infected wounds, suppurating wounds, discharging wounds, burns, and skin disorders in animals, the process comprising the steps of:
applying a steam distillation process to a mixture of leaves of each of Gotu Kola, Common Plantain, Figwort, Yarrow and Pau d'Arco each at 1% to 12% by weight prior to extraction; and
placing the distillate in a container which is then sealed.

19. A process for producing a topical healing essential oil for use in the treatment of one or more of hairless scars, degloving soft tissue injuries, dermatitis, abrasions, wounds, infected wounds, suppurating wounds, discharging wounds, burns, and skin disorders in animals, the process comprising the steps of:
applying a wax extraction process to a mixture of leaves of each of Gotu Kola, Common Plantain, Figwort, Yarrow and Pau d'Arco each at 1% to 12% by weight prior to extraction; and
placing the extract in a container which is then sealed.

20. A process for producing a topical healing powder for use in the treatment of one or more of hairless scars, degloving soft tissue injuries, dermatitis, abrasions, wounds, infected wounds, suppurating wounds, discharging wounds, burns, and skin disorders in animals, the process comprising the steps of:
adding each of Gotu Kola, Common Plantain, Figwort, Yarrow and Pau d'Arco in powder form each at 1% to 12% by weight to a powder base;
mixing the Gotu Kola, Common Plantain, Figwort, Yarrow and Pau d'Arco in powder form with the powder base; and
placing the mixture in a container which is then sealed.

21. A process for producing a topical healing oil for use in the treatment of one or more of hairless scars, degloving soft tissue injuries, dermatitis, abrasions, wounds, infected wounds, suppurating wounds, discharging wounds, burns, and skin disorders in animals, the process comprising the steps of:
placing roughly chopped dried leaves of each of Gotu Kola, Common Plantain, Figwort, Yarrow and Pau d'Arco each at 1% to 12% by weight prior to extraction in a container;
covering the leaves with oil;
maintaining the leaves covered in oil at a temperature of between 12° C. to 24° C. for at least 3 weeks;
filtering the leaves from the oil; and
packaging the filtered oil.

22. The process for producing a topical healing oil of claim 21 in which the oil comprises jojoba oil.

23. A process for producing a topical healing body butter for use in the treatment of one or more of hairless scars, degloving soft tissue injuries, dermatitis, abrasions, wounds, infected wounds, suppurating wounds, discharging wounds, burns, and skin disorders in animals, the process comprising the steps of:
melting beeswax and shea butter over a low heat;
adding at least one of an oil and an essential oil to the melted beeswax and shea butter mixture, the oil containing each of Gotu Kola, Common Plantain, Figwort, Yarrow and Pau d'Arco each at 1% to 12% by weight prior to extraction and the essential oil containing each of Gotu Kola, Common Plantain, Figwort, Yarrow and Pau d'Arco each at 1% to 12% by weight prior to extraction;
mixing the melted beeswax and shea butter with the at least one of an oil and an essential oil; and
packaging the body butter.

24. The topical healing formulation of claim 1 further comprising a carrier base comprising one or more of the following: petrolatum, soft white paraffin, an emollient, Silcock's base, an aqueous cream, jojoba oil, shea butter, coconut oil, Dragon's Blood resin, a thickener, a stabilizer, an essential oil and a preservative.

* * * * *